(12) United States Patent
Chen et al.

(10) Patent No.: US 9,485,010 B1
(45) Date of Patent: Nov. 1, 2016

(54) ADAPTIVE CODING AND MODULATION FOR SPOT BEAM SATELLITE BROADCAST

(75) Inventors: Ernest C. Chen, San Pedro, CA (US);
Joseph Santoru, Agoura Hills, CA (US); Patrick J. Loner, Los Angeles, CA (US); Shamik Maitra, Redondo Beach, CA (US); Donald J. Breier, Torrance, CA (US); Leon J. Stanger, Farmington, UT (US); Dennis Lai, Cerritos, CA (US); Tung-Sheng Lin, Claremont, CA (US); Guangcai Zhou, Agoura Hills, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 2085 days.

(21) Appl. No.: 11/376,813

(22) Filed: Mar. 16, 2006

Related U.S. Application Data

(63) Continuation-in-part of application No. 09/950,511, filed on Sep. 10, 2001, now Pat. No. 7,047,029.

(51) Int. Cl.
*H04B 7/185* (2006.01)

(52) U.S. Cl.
CPC ........ *H04B 7/18523* (2013.01); *H04B 7/1851* (2013.01); *H04B 7/18513* (2013.01)

(58) Field of Classification Search
CPC .......... H04B 7/18523; H04B 7/18513; H04B 7/1851
USPC ................ 455/427–430, 12.1–13.4; 370/318
See application file for complete search history.

(56) References Cited

U.S. PATENT DOCUMENTS

| | | | |
|---|---|---|---|
| 3,896,382 A | 7/1975 | Magenheim | |
| 4,004,224 A | 1/1977 | Arens et al. | |
| 4,207,431 A | 6/1980 | McVoy | |
| 4,301,533 A | 11/1981 | Acampora et al. | |
| 4,309,764 A | 1/1982 | Acampora | |
| 4,567,485 A | 1/1986 | Oshima et al. | |
| 4,776,035 A | 10/1988 | Duggan | |
| 4,837,580 A | 6/1989 | Frazita | |
| 4,837,786 A | 6/1989 | Gurantz et al. | |
| 4,888,596 A | 12/1989 | Conanan | |
| 4,896,369 A | 1/1990 | Adams et al. | |
| 4,910,792 A | 3/1990 | Takahata et al. | |
| 4,941,199 A | 7/1990 | Saam | |
| 5,060,292 A | 10/1991 | Ayukawa et al. | |
| 5,081,713 A | 1/1992 | Miyazaki | |
| 5,204,970 A | 4/1993 | Stengel et al. | |
| 5,257,029 A | 10/1993 | Miyo | |
| 5,521,943 A | 5/1996 | Dambacher | |
| 5,559,561 A * | 9/1996 | Wei ............................ | 348/470 |
| 5,579,367 A | 11/1996 | Raymond et al. | |

(Continued)

OTHER PUBLICATIONS

Notice of Allowance dated Jan. 2, 2009 in U.S. Appl. No. 10/947,624, filed Sep. 21, 2004 by Patrick J. Loner.

(Continued)

*Primary Examiner* — Raymond Dean

(57) ABSTRACT

A method and apparatus for adaptively controlling a transmission signal for transmission to at least one receiver in a terrestrial region is disclosed. The method selects a transmission signal mode having a modulation scheme, code scheme, and code rate from a plurality of transmission signal modes according to received information, generates a transmission signal according to the selected mode, and transmits the generated transmission signal to the receiver.

36 Claims, 12 Drawing Sheets

(56) References Cited

U.S. PATENT DOCUMENTS

| | | |
|---|---|---|
| 5,666,648 A | 9/1997 | Stuart |
| 5,691,980 A | 11/1997 | Welles et al. |
| 5,758,260 A | 5/1998 | Wiedeman |
| 5,793,813 A | 8/1998 | Cleave |
| 5,798,731 A | 8/1998 | Lesthievent |
| 5,801,754 A | 9/1998 | Ruybal et al. |
| 5,812,947 A | 9/1998 | Dent |
| 5,867,109 A | 2/1999 | Wiedeman |
| 5,878,329 A | 3/1999 | Mallinckrodt |
| 5,898,680 A | 4/1999 | Johnstone et al. |
| 5,918,156 A | 6/1999 | Tanabe |
| 5,949,766 A | 9/1999 | Ibanez-Meier et al. |
| 5,956,619 A | 9/1999 | Gallagher et al. |
| 5,959,984 A | 9/1999 | Dent |
| 5,999,127 A | 12/1999 | Dezelan |
| 6,002,422 A | 12/1999 | Mastenbrook |
| 6,044,323 A | 3/2000 | Yee et al. |
| 6,085,067 A | 7/2000 | Gallagher et al. |
| 6,118,999 A | 9/2000 | Moraes et al. |
| 6,125,261 A | 9/2000 | Anselmo et al. |
| 6,141,534 A | 10/2000 | Snell et al. |
| 6,151,308 A | 11/2000 | Ibanez-Meier et al. |
| 6,173,178 B1 | 1/2001 | Hammill et al. |
| 6,181,932 B1 | 1/2001 | Kolev et al. |
| 6,212,360 B1 | 4/2001 | Fleming et al. |
| 6,219,528 B1 | 4/2001 | Wright et al. |
| 6,233,451 B1 | 5/2001 | Noerpel et al. |
| 6,272,340 B1 | 8/2001 | Wright et al. |
| 6,297,845 B1 | 10/2001 | Kuhn et al. |
| 6,317,420 B1 | 11/2001 | Schiff |
| 6,324,381 B1 | 11/2001 | Anselmo et al. |
| 6,335,920 B1 | 1/2002 | Strodtbeck et al. |
| 6,339,611 B1 | 1/2002 | Antonio et al. |
| 6,366,776 B1 | 4/2002 | Wright et al. |
| 6,385,773 B1 | 5/2002 | Schwartzman et al. |
| 6,421,528 B1 | 7/2002 | Rosen et al. |
| 6,430,394 B1 | 8/2002 | Boyden |
| 6,466,569 B1 | 10/2002 | Wright et al. |
| 6,473,858 B1 | 10/2002 | Shimomura et al. |
| 6,493,538 B1 | 12/2002 | Jabbarnezhad |
| 6,512,749 B1 | 1/2003 | Wright et al. |
| 6,519,446 B2 | 2/2003 | Tawil et al. |
| 6,526,575 B1 | 2/2003 | McCoy et al. |
| 6,532,220 B1 | 3/2003 | Carneal et al. |
| 6,580,452 B1 | 6/2003 | Gangitano |
| 6,587,687 B1 | 7/2003 | Wiedeman |
| 6,594,469 B1 | 7/2003 | Serri et al. |
| 6,628,919 B1 | 9/2003 | Curello et al. |
| 6,647,270 B1 | 11/2003 | Himmelstein |
| 6,704,543 B1 | 3/2004 | Sharon et al. |
| 6,724,737 B1 | 4/2004 | Boyden et al. |
| 6,745,043 B1 | 6/2004 | Lester et al. |
| 6,757,264 B1 | 6/2004 | Gayrard |
| 6,763,006 B1 | 7/2004 | Lockett |
| 6,813,476 B1 | 11/2004 | Brooker |
| 6,813,485 B2 | 11/2004 | Sorrells et al. |
| 6,834,180 B1 | 12/2004 | Marshall |
| 6,836,650 B2 | 12/2004 | Sorrells et al. |
| 6,842,437 B1 | 1/2005 | Heath |
| 6,859,652 B2 | 2/2005 | Karabinis et al. |
| 6,920,185 B2 | 7/2005 | Hinson |
| 6,925,113 B2 | 8/2005 | Kim et al. |
| 6,975,582 B1 | 12/2005 | Karabinis et al. |
| 6,990,314 B1 | 1/2006 | Hagen et al. |
| 7,043,200 B2 | 5/2006 | Andenæs |
| 7,047,029 B1 | 5/2006 | Godwin et al. |
| 7,308,020 B2 * | 12/2007 | Ishii et al. ............... 375/148 |
| 7,352,953 B1 * | 4/2008 | Hogan ................... 386/46 |
| 7,408,892 B2 | 8/2008 | Dale et al. |
| 7,522,555 B2 * | 4/2009 | Li et al. ................. 370/329 |
| 7,607,154 B2 * | 10/2009 | Morello ................. 725/63 |
| 2002/0021761 A1 * | 2/2002 | Zhang et al. ........... 375/240.27 |
| 2002/0041328 A1 | 4/2002 | LeCompte et al. |
| 2002/0049985 A1 * | 4/2002 | Olshansky et al. ...... 725/146 |
| 2002/0058505 A1 * | 5/2002 | Kim et al. ............. 455/427 |
| 2002/0061073 A1 | 5/2002 | Huang et al. |
| 2002/0066102 A1 | 5/2002 | Chapman et al. |
| 2002/0146979 A1 | 10/2002 | Regulinski et al. |
| 2002/0168974 A1 | 11/2002 | Rosen et al. |
| 2003/0005437 A1 | 1/2003 | Feuer et al. |
| 2003/0016634 A1 | 1/2003 | Freedman et al. |
| 2003/0054816 A1 * | 3/2003 | Krebs et al. ............ 455/428 |
| 2003/0073435 A1 | 4/2003 | Thompson et al. |
| 2003/0203733 A1 | 10/2003 | Sharon |
| 2004/0072570 A1 * | 4/2004 | Smith ..................... 455/446 |
| 2005/0020204 A1 | 1/2005 | Ducasse |
| 2005/0037706 A1 | 2/2005 | Settle |
| 2005/0141445 A1 | 6/2005 | Dunas et al. |
| 2007/0209057 A1 * | 9/2007 | Musson et al. ........... 725/111 |
| 2008/0088462 A1 | 4/2008 | Breed |

OTHER PUBLICATIONS

Notice of Allowance dated Jan. 11, 2006 in U.S. Appl. No. 09/950,511, filed Sep. 10, 2001 by John P. Godwin.
Non-final Office Action dated Aug. 11, 2005 in U.S. Appl. No. 09/950,511, filed Sep. 10, 2001 by John P. Godwin.
Non-final Office Action dated Mar. 11, 2005 in U.S. Appl. No. 09/950,511, filed Sep. 10, 2001 by John P. Godwin.
Notice of Allowance dated Jun. 8, 2009 in U.S. Appl. No. 11/222,085, filed Sep. 8, 2005 by Ronald C. Barrett.
Final Rejection dated Dec. 31, 2008 in U.S. Appl. No. 11/222,085, filed Sep. 8, 2005 by Ronald C. Barrett.
Non-final Office Action dated Jul. 14, 2008 in U.S. Appl. No. 11/222,085, filed Sep. 8, 2005 by Ronald C. Barrett.
Non-final Office Action dated Jan. 25, 2008 in U.S. Appl. No. 11/222,085, filed Sep. 8, 2005 by Ronald C. Barrett.
Notice of Allowance dated Jun. 30, 2005 in U.S. Appl. No. 10/291,165, filed Nov. 8, 2002 by Ronald C. Barrett.
Non-final Office Action dated Feb. 2, 2005 in U.S. Appl. No. 10/291,165, filed Nov. 8, 2002 by Ronald C. Barrett.

* cited by examiner

| Mode No. | Modulation Type | FEC Code | Inner Code Rate | Symbol Rate (Mbaud) | Payload Rate (Bits/Symbol) | Paylod Rate (Mbits/sec) | CNR for QEF Code Only (dB) | CNR for QEF Modem B2B (dB) |
|---|---|---|---|---|---|---|---|---|
| 1 | QPSK | LDPC+BCH | 1/2 | 20 | 0.989 | 19.78 | 1.0 | 1.5 |
| 2 | QPSK | LDPC+BCH | 3/5 | 20 | 1.188 | 23.76 | 2.3 | 2.8 |
| 3 | QPSK | LDPC+BCH | 2/3 | 20 | 1.322 | 26.45 | 3.1 | 3.6 |
| 4 | QPSK | LDPC+BCH | 3/4 | 20 | 1.487 | 29.75 | 4.1 | 4.6 |
| 5 | QPSK | LDPC+BCH | 4/5 | 20 | 1.587 | 31.74 | 4.7 | 5.2 |
| 6 | QPSK | LDPC+BCH | 5/6 | 20 | 1.655 | 33.09 | 5.2 | 5.7 |
| 7 | QPSK | LDPC+BCH | 8/9 | 20 | 1.766 | 35.32 | 6.2 | 6.7 |
| 8 | QPSK | LDPC+BCH | 9/10 | 20 | 1.789 | 35.77 | 6.5 | 7.0 |
| 9 | 8PSK | LDPC+BCH | 3/5 | 20 | 1.74 | 34.79 | 5.5 | 6.0 |
| 10 | 8PSK | LDPC+BCH | 2/3 | 20 | 1.936 | 38.71 | 6.6 | 7.1 |
| 11 | 8PSK | LDPC+BCH | 3/4 | 20 | 2.178 | 43.55 | 7.9 | 8.4 |
| 12 | 8PSK | LDPC+BCH | 5/6 | 20 | 2.479 | 49.57 | 9.4 | 9.9 |
| 13 | 8PSK | LDPC+BCH | 8/9 | 20 | 2.646 | 52.92 | 10.7 | 11.2 |
| 14 | 8PSK | LDPC+BCH | 9/10 | 20 | 2.679 | 53.58 | 11.0 | 11.5 |

FIG. 7

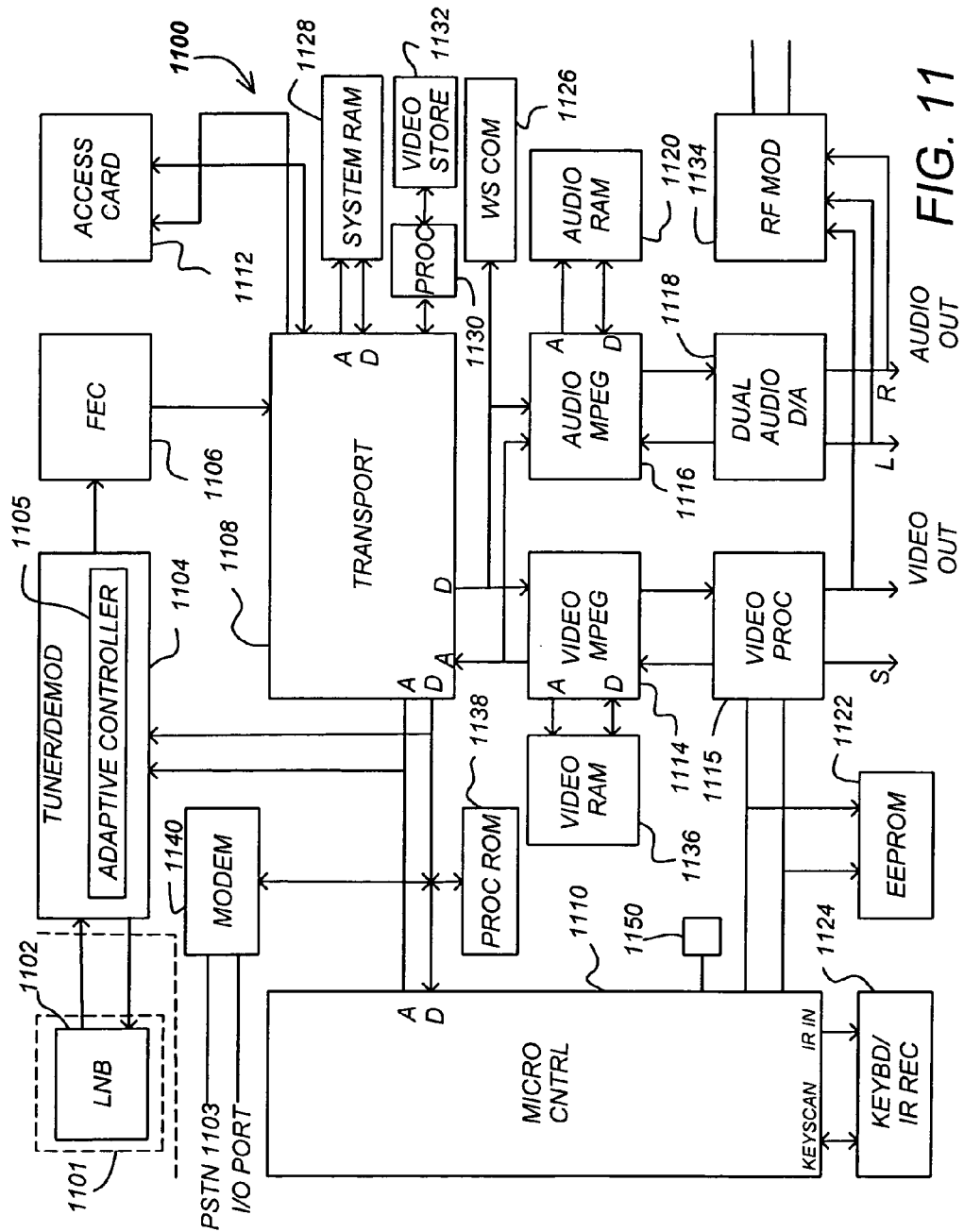

ADAPTIVE CODING AND MODULATION FOR SPOT BEAM SATELLITE BROADCAST

CROSS REFERENCE TO RELATED APPLICATIONS

This application is a continuation-in-part (CIP) of application Ser. No. 09/950,511, entitled "ADAPTIVE TRANSMISSION SYSTEM," by John P. Godwin, Patrick J. Loner, and James C. Williams, filed Sep. 10, 2001, now U.S. Pat. No. 7,047,029 which application is hereby incorporated by reference.

BACKGROUND OF THE INVENTION

1. Field of the Invention

This invention relates to systems and methods for improving a power and bandwidth constrained transmission system, and in particular to a system and method for adaptively varying the transmission signal according to measured or predicted time-varying signal propagation characteristics.

2. Description of the Related Art

A typical communications system, whether terrestrial or satellite-based, is constrained in its transmission power and signal bandwidth. The communications system may also be required to deliver reliable communications to one point, as in a terrestrial microwave link, or to many points in a satellite broadcast system serving the United States.

A typical satellite communications system servicing a large geographical region such as the United States is typically designed such that all signals transmitted to terrestrially based receivers have a minimum carrier to noise ratio (CNR) when received anywhere in the service area or coverage region. The CNR of the signal at the receiver is a function of a number of parameters, including the power of the signal transmitted from the satellite and signal propagation characteristics such as atmospheric attenuation. Unfortunately, at the wavelengths typically used in satellite-to-home television broadcasts, rain and other sources of atmospheric attenuation have a significant effect upon the CNR. Hence, during heavy rain, some customers can experience degraded signal quality.

In the past, system designers have assured a minimum signal quality is provided by designing the satellite transmitters, power systems, and related components to produce sufficient power to assure a minimum CNR in all regions, even when compromised by unfavorable atmospheric attenuation characteristics. Unfortunately, the amount of attenuation from rain and similar atmospheric parameters can be substantial and widely varying. Hence, to achieve the desired CNR in all areas (including those with intense rain) this solution requires that the satellite transmitters, power system and related components be designed for high performance levels.

Increasing transmitter power on a communications satellite may be economically impractical or even technologically infeasible. Satellites have severe limitations on weight which can be delivered at desired orbital locations due to launch vehicle costs and other limitations. This weight limitation constrains the size of solar panels, the charge capabilities of the on-board batteries, and the physical size of the transmitter and related electronics. Furthermore, one type of transmitter, the traveling wave tube amplifier (TWT) has upper power limits for reliable operation.

Systems have been defined for controlling transmitter power to account for variable weather conditions, including U.S. Pat. No. 6,587,687 for a "Multiple Satellite Fade Attenuation Control System," U.S. Pat. No. 6,421,528 for a "Satellite Transmission System with Adaptive Transmission Loss Compensation," and U.S. Pat. No. 5,878,328, for "Power Control of an Integrated Cellular Communication System." However, the solutions offered by these systems do not teach selecting signal transmission modes defined by characteristics such as modulation type, coding, and coding rate to adaptively control the transmission system either alone or as an adjunct to varying the transmitter power. Hence, allocation of system transmission resources in such systems are typically sub-optimal.

What is needed is a system and method that ameliorates the foregoing limitations. The present invention satisfies that need.

SUMMARY OF THE INVENTION

To address the requirements described above, the present invention discloses a method, apparatus, and article of manufacture for adaptively controlling a transmission signal from a satellite to at least one terrestrial receiver in a terrestrial region.

The method comprises the steps of receiving information describing a time-varying propagation characteristic of the transmission signal in the terrestrial region, selecting a transmission signal mode from a plurality of transmission signal modes according to the received information, the transmission signal modes defined by transmission signal characteristics including modulation scheme, code scheme, and code rate, generating a transmission signal according to the transmission signal mode, and transmitting the generated transmission signal to the receiver.

The apparatus comprises an information receiver for receiving information describing a time-varying propagation characteristic of the signal in the terrestrial region, a signal generator for generating a transmission signal according to a selected one of a plurality of transmission signal modes, wherein the selected one of the transmission signal modes is selected according to the received information and the transmission signal modes are defined by transmission signal characteristics including modulation scheme, code scheme, and code rate, and a transmitter for transmitting the generated transmission signal.

The present invention applies to a variety of terrestrial and satellite applications, but is especially advantageous in satellite distribution systems. Communications satellites are highly constrained in their DC and RF power capabilities, and also are typically required to deliver signals to widely distributed locations. The communications line-of-sight to each delivery point will have a unique time-varying propagation characteristic.

BRIEF DESCRIPTION OF THE DRAWINGS

Referring now to the drawings in which like reference numbers represent corresponding parts throughout:

FIG. 7 presents a table of transmission signal modes;

FIG. 11 is a diagram of an exemplary receiver for use the video distribution system.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
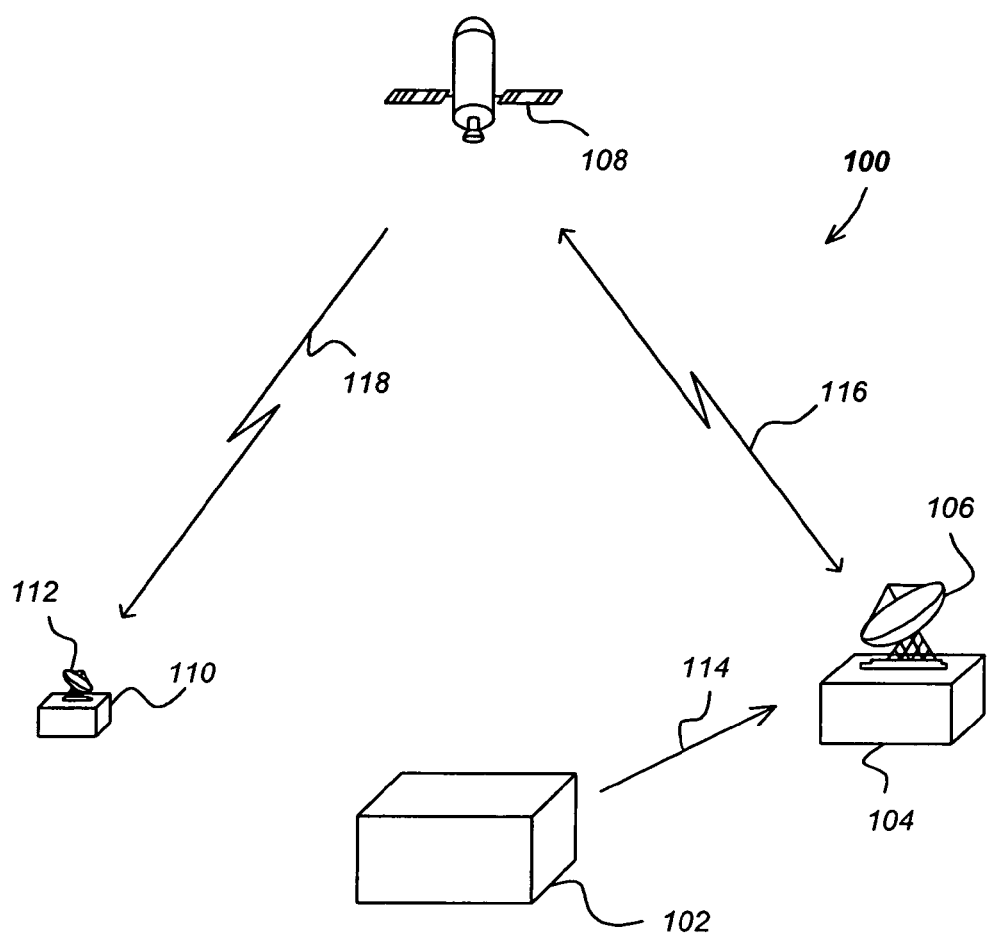
FIG. 1 is a block diagram illustrating an overview of a prior art video distribution system.

FIG. 1 is a diagram illustrating an overview of a multi-channel video distribution system 100. The video distribution system 100 comprises an uplink center 104, a satellite 108, a terrestrial receiver 112 and a subscriber 110.

The uplink center 104 receives program material from external sources 102 via a communications link 114, and using an uplink antenna 106, transmits the program material and program control information to the satellite 108 via uplink 116. The satellite receives and transmits the video programs and control information to the subscriber via downlink transmission signal 118. The subscriber 110 receives this information using the terrestrial receiver 112. In one embodiment, the terrestrial receiver 112 includes an 18-inch offset-fed Ku-band antenna.

The video distribution system 100 can comprise a plurality of satellites 108 in order to provide wider terrestrial coverage, to provide additional channels, or to provide additional bandwidth per channel. In one embodiment of the invention, each satellite comprises 16 Ku band transponders to receive and transmit program material and other control data from the uplink center 104 and provide it to the subscribers 110. However, using data compression and multiplexing techniques the television channel capabilities are far greater. For example, two satellites 108 working together can receive and broadcast over 200 conventional (non-HDTV) television channels via 32 satellite transponders.

While the invention disclosed herein is described with reference to a satellite based digital video distribution system 100, the present invention may also be practiced with terrestrial-based transmission of program information, whether by broadcast, unicast, cable, the Internet, or other means. Further, the different functions collectively allocated among the control center 102 and the uplink center 104 as described above can be reallocated between these facilities as desired without departing from the intended scope of the present invention.

Although the foregoing has been described with respect to an embodiment in which the program material delivered to the subscriber is video (and audio) program material such as a movie, the foregoing method can be used to deliver program material comprising purely audio or purely data, or any combination of information as well.

Figure 2:
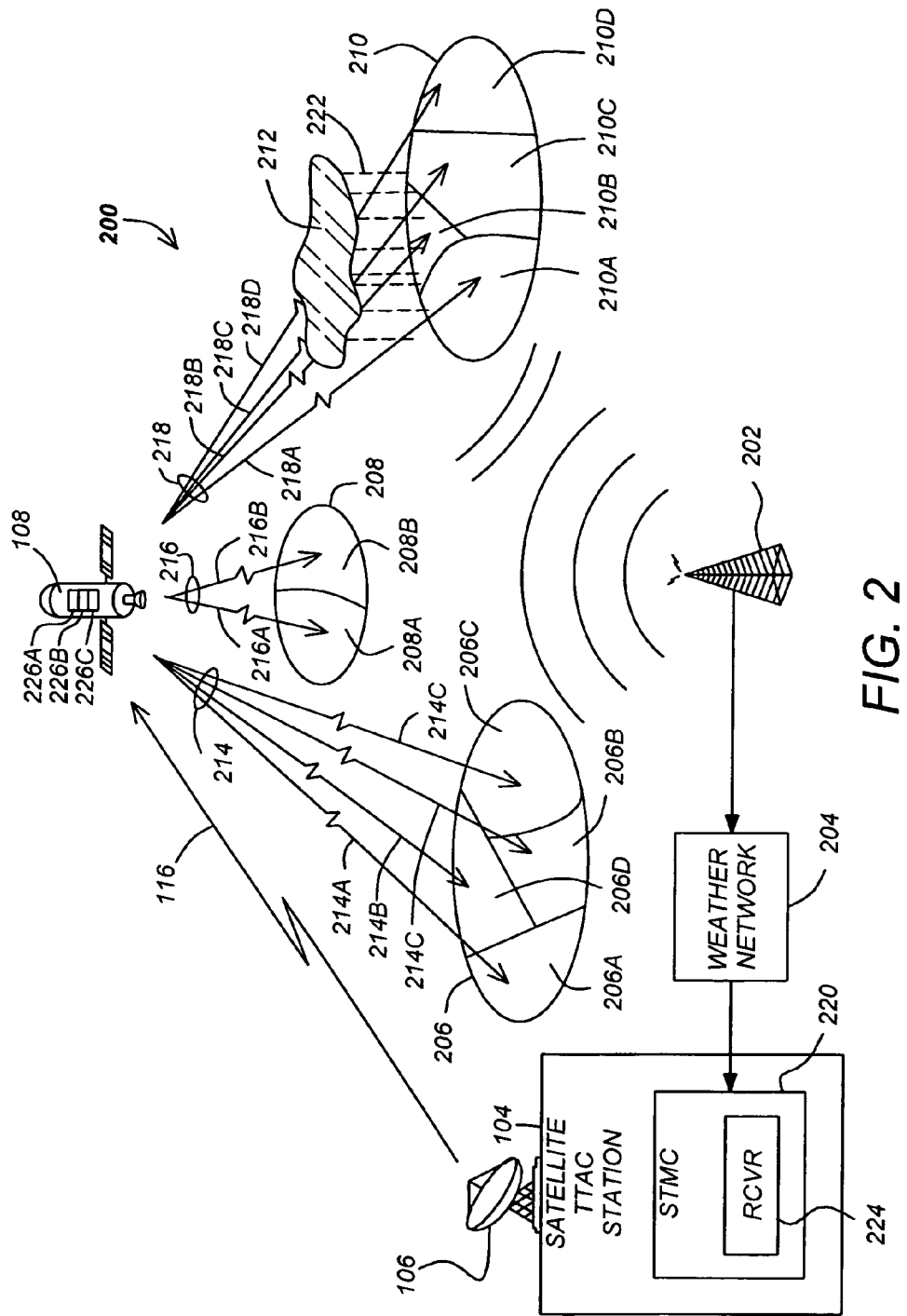
FIG. 2 is a diagram showing an overview of one embodiment of the video distribution system of the present invention.

FIG. 2 is a system block diagram of one embodiment of a video distribution network 200. As described above, each satellite 108 in the video distribution system 100 comprises a plurality of transponders or transmitters 226A-226C (hereinafter referred to as transponder(s) or transmitter(s) 226) to receive and transmit program material and other data. In this embodiment, the satellite 108 transponders are configured such that a given transponder serves an associated region so as to permit selectable and controllable transmission of transmission signals to one or more terrestrial service regions 206, 208, and 210 within the continental United States (CONUS) or other geographical entity. While FIG. 2 illustrates a case with three service regions, the present invention can be used with any number of service regions, each served by some number of transmission signals.

In another, more elementary embodiment, all signals are delivered to all areas as in a television broadcast to all of the United States. In this embodiment, the satellite power distribution over CONUS is varied to mitigate the time-varying propagation characteristic to each point in CONUS. This power distribution variation can be created by electronically or mechanically varying the satellite transmitting antenna.

Sub-regions can also be defined within each terrestrial service region 206-210. As illustrated in FIG. 2, terrestrial region 206 includes sub-regions 206A-206D, terrestrial region 208 includes sub-regions 208A and 208B, and terrestrial region 210 includes sub-regions 210A-210D.

Sub-regions are areas within the terrestrial regions 210 in which programming transmitted to subscribers may differ (i.e. local programming). In a conventional design, the regional beams are shaped, and the selected transmitter power levels selected, to give approximately uniform availability in each service area. The selected transmitters 226 are selected based on their maximum or saturated power levels and the number of different power levels is minimized to maintain equipment commonality in the satellite repeater. Each beam has one or more transmitters (transponders) 226 assigned which is proportional to the digital information destined to be transmitted to that region. Isolation between beams permits frequency reuse and, if satellite prime power is available, more communications capacity can be provided.

In one embodiment, the sub-regions are defined as designated marketing areas (DMAs), which can be defined according contractual arrangements or to comply with regulatory restraints regarding the retransmission of locally broadcast program material (regulatory constraints may prevent reception of satellite-transmitted programming in neighboring DMAs).

The transmission of signals from the satellite 108 to the subscriber antennae of the terrestrial receivers 112 within the terrestrial regions 206, 208, and 210 and the sub-regions 206A-206D, 208A-208B, and 210A-210D therein can be significantly affected by time-varying atmospheric disturbances 212 such as precipitation in the form of rainfall, sleet, and snow. Such atmospheric disturbances negatively affect the propagation characteristics of the downlink transmission signal 118 to the subscriber antennae, reducing the quality of the received transmission signal (as evidenced by a reduced CNR and hence a lower-quality presentation of the program material). Atmospheric disturbance as secondary effects (such as increased subscriber antenna noise temperature) also contribute to reduced received signal quality.

The video distribution system 200 of the present invention adaptively controls generation and/or transmission of the downlink transmission signal 118 to the subscribers 110 in terrestrial regions 206-210 or sub-regions 206A-206D, 208A-208B, and 210A-210D to account for the above-described time-varying propagation characteristics. The downlink 118 quality is improved within the total power and bandwidth limitations of the satellite 108 used in the video distribution system 200.

Normally rain events cover only a small portion of the area served by a satellite system; for example, storms may be occurring along the Gulf Coast, but the remainder of CONUS may be quite clear. Also, the expanding weather network 204 (e.g. radar) gives, for the first time, near real-time nationwide information on where storms are in progress and where they are moving. This weather radar data gives rain intensity plots which directly correlate with rain attenuation at the microwave frequencies typically used in satellite communications.

In one embodiment, the information regarding the time-varying propagation characteristic is information regarding the precipitation in one or more of the terrestrial regions 206-210 and/or sub-regions 206A-206D, 208A-208B, and 210A-210D. This information can be obtained from the transmission signal itself, other internally derived sources (e.g. from transmitter information), or from sources independent from the transmission signal such as the Internet, the National Oceanic and Atmospheric Administration (NOAA), or similar sources. Ultimately, such precipitation information may be compiled in a weather information network 204 from radar measurements obtained from terrestrially based radar stations 202, from radar or infrared measurements from satellites, or from ground traditional ground measurements from terrestrially-based weather observation observations.

The precipitation information is provided to a satellite transmission management controller (STMC) 220 for processing. The information provided to the STMC 220 can include time-stamped samples (or "snapshots") of measured precipitation at specified intervals, or raw real-time data. The STMC 220 receives this information, and derives estimate of the propagation characteristic of the signal transmitted from the satellite 108 to the subscribers 110 in each particular terrestrial region 206-210 or sub-region 206A-206D, 208A-208B, and 210A-210D of interest. If desired, the estimate of the propagation characteristic can be predictive in nature (i.e. represent a prediction of the precipitation or propagation characteristic for a given terrestrial region 206-210 or sub-region 206A-206D, 208A-208B, and 210A-210D for one or more intervals of time). Alternatively or in combination with the foregoing, such predictions can be generated in the weather information network 204, or external to the video distribution system 200.

Using the estimate of the propagation characteristic of the signal transmitted from the satellite 108 to the subscribers 110 in each particular terrestrial region 206-210 or sub-region 206A-206D, 208A-208B, and 210A-210D of interest, the STMC 220 provides information to the satellite 108 regarding the desired transmission signal characteristics for each region or sub-region. Using this information, the satellite 108 is commanded to adjust the transponder(s) 226 servicing each terrestrial region 206-210 or sub-region 206A-206D, 208A-208B, and 210A-210D in order to obtain a desired service quality for the signal received at by each subscriber 110. For example, the satellite 108 in the video distribution system shown in FIG. 2 includes at least three transponders, wherein the first transponder transmits a first group 214 of signals 214A-214D to sub-regions 206A-206D, respectively; the second transponder transmits a second group 216 of signals 216A-216B to sub-regions 208A-208B, respectively; and the third transponder transmits a third group 218 of signals 218A-218D to sub-regions 210A-210D, respectively. Terrestrially based radar station 202 obtains data regarding the precipitation 222 from storm 212, which negatively impacts the propagation characteristic of transmission signals 218A-218D. The data includes, for example a measurement of the rain intensity in locations within the sub-regions of interest (210A-210D). The data is transmitted to a weather network 204 and to a receiver 224 in the STMC 220, where it is processed and used to control the transmission of signals from the satellite 108. In this case, since the precipitation 222 will reduce the signal quality in sub-regions 210A-210D, the transmission signals 218A-218D are adjusted accordingly. As described below, the signals can be adjusted to increase the average or instantaneous power of the signal carrier, the beamwidth of the transmission signal can be reduced (thus increasing the power of the signal in a portion of the coverage area), a higher, more robust level of forward error correction (FEC) can be selected and less information delivered, or any combination of these adjustments can be made.

Figure 3:
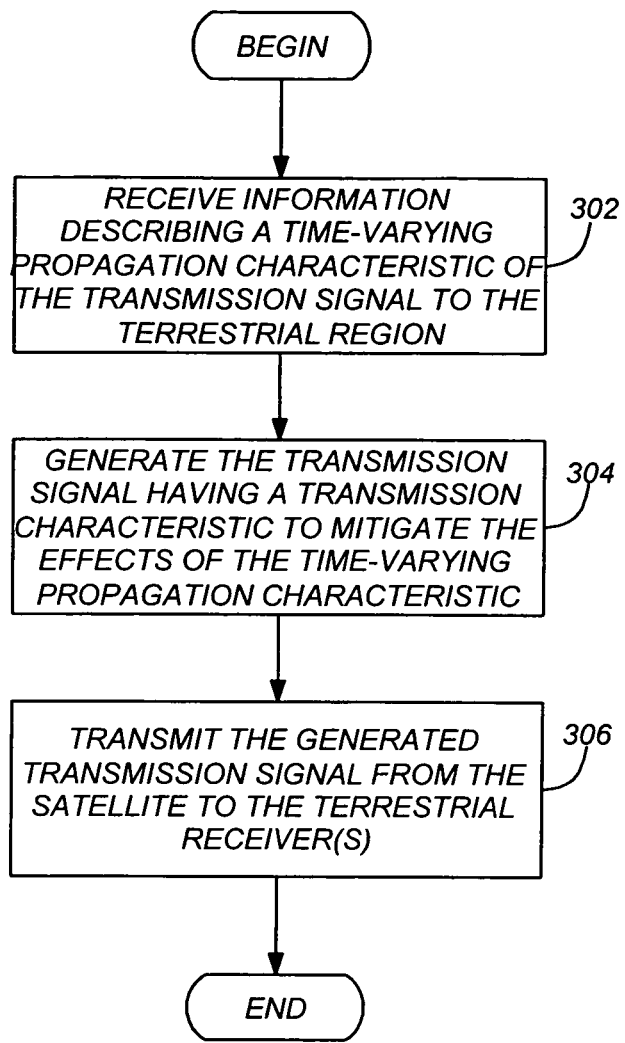
FIG. 3 is a flow chart showing illustrative method steps usable to practice one embodiment of the present invention.

FIG. 3 is a block diagram presenting an illustrative embodiment of method steps used to practice the invention. As shown in block 302, information describing a time-varying propagation characteristic of the transmission signal 118 from the satellite 108 to the terrestrial region or sub-region of interest is received. This information can include periodic or aperiodic measurement data, real-time measurement data, predicted information based on measurement data, or any combination of the above. The time-varying propagation characteristic may also include information regarding background noise, or any other time-varying information that is a significant factor in determining the quality of the signal received at the subscriber 110. As described above, the information can include information regarding the precipitation in the terrestrial regions or sub-regions of interest. Precipitation measurement data can be obtained from terrestrially based weather radar, satellite data, or other means. Other information may include the Quality of Service (QoS) indicators from one or more receivers in the service field, tagged with the locations of the receivers and reported continuously or periodically. The QoS indicators may include CNR, signal power, or other relevant information.

As shown in block 304, a transmission signal having a transmission characteristic controlled in accordance with the received time-varying propagation characteristic is then generated. In an embodiment in which the controlled transmission characteristic is signal power, this is accomplished by controlling the power of the transmitted signal according to the time-varying propagation characteristic. This may include, for example, the average power of a particular individual carrier or group of carriers and/or a particular signal component or group of components, the instantaneous power of the carrier(s) and/or signal component(s), or the average carrier power of one or more transponders on a terrestrial, airborne, or space-deployed communications repeater (such as satellite 108). In another embodiment of the invention, this is accomplished by controlling the beamwidth or power distribution across the coverage area of the transmitted signal from the satellite 108, thus increasing the effective power within a portion of the area covered by the transmitted signal beam. In another embodiment of the invention, this is accomplished by adjusting the carrier power for all signals serving a broad geographical region (e.g. regions 206, 208 or 210) by controlling the spatial power distribution characteristics of the transmit antenna on the satellite 108. In yet another embodiment of the present invention, the transmitted signal incorporates forward error correction (FEC), and the FEC applied to the transmitted signal is controlled according to the time-varying propagation characteristic. For example, in cases where the propagation characteristic indicates that a particular terrestrial region or sub-region will be subject to increased signal attenuation (for example, due to a localized rainstorm), the FEC bits applied to the error correction may be increased (with a reduction in the bandwidth of the information transfer) to assure that the most critical information is received at an acceptable quality level. Power levels, power distribution patterns, and FEC levels can also be selected in combination to achieve the desired combination of received signal quality and bandwidth. Several levels of FEC can be applied (e.g. turbo codes with 7/8, turbo codes with 4/5, convolutional codes with 6/7, and convolutional codes with 2/3 can be used).

As shown in block 306, the generated signal is then transmitted from the satellite 108 to the subscribers' terrestrial receivers.

Figure 4A:
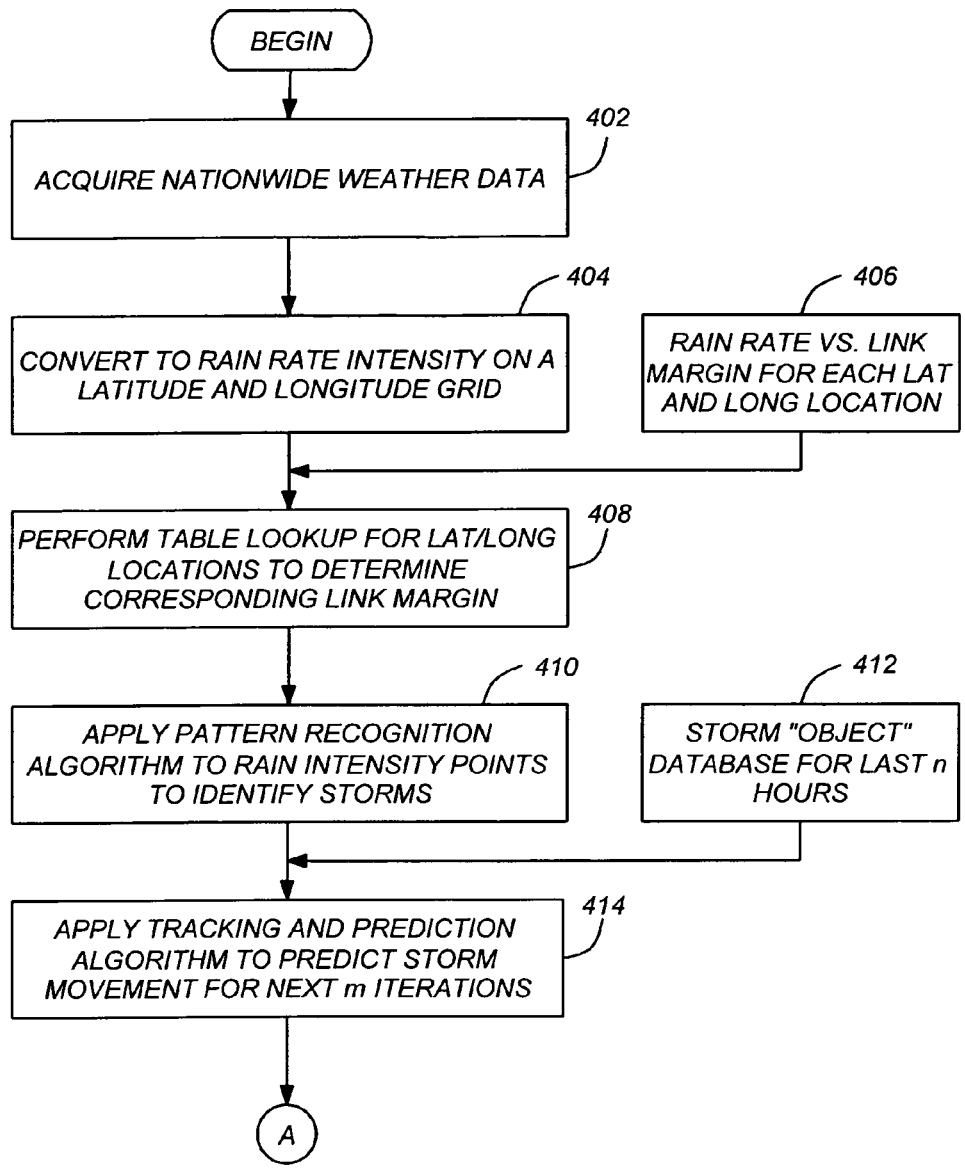
FIGS. 4A and 4B present a flow chart illustrating method steps usable to practice a further embodiment of the present invention.
Figure 4B:
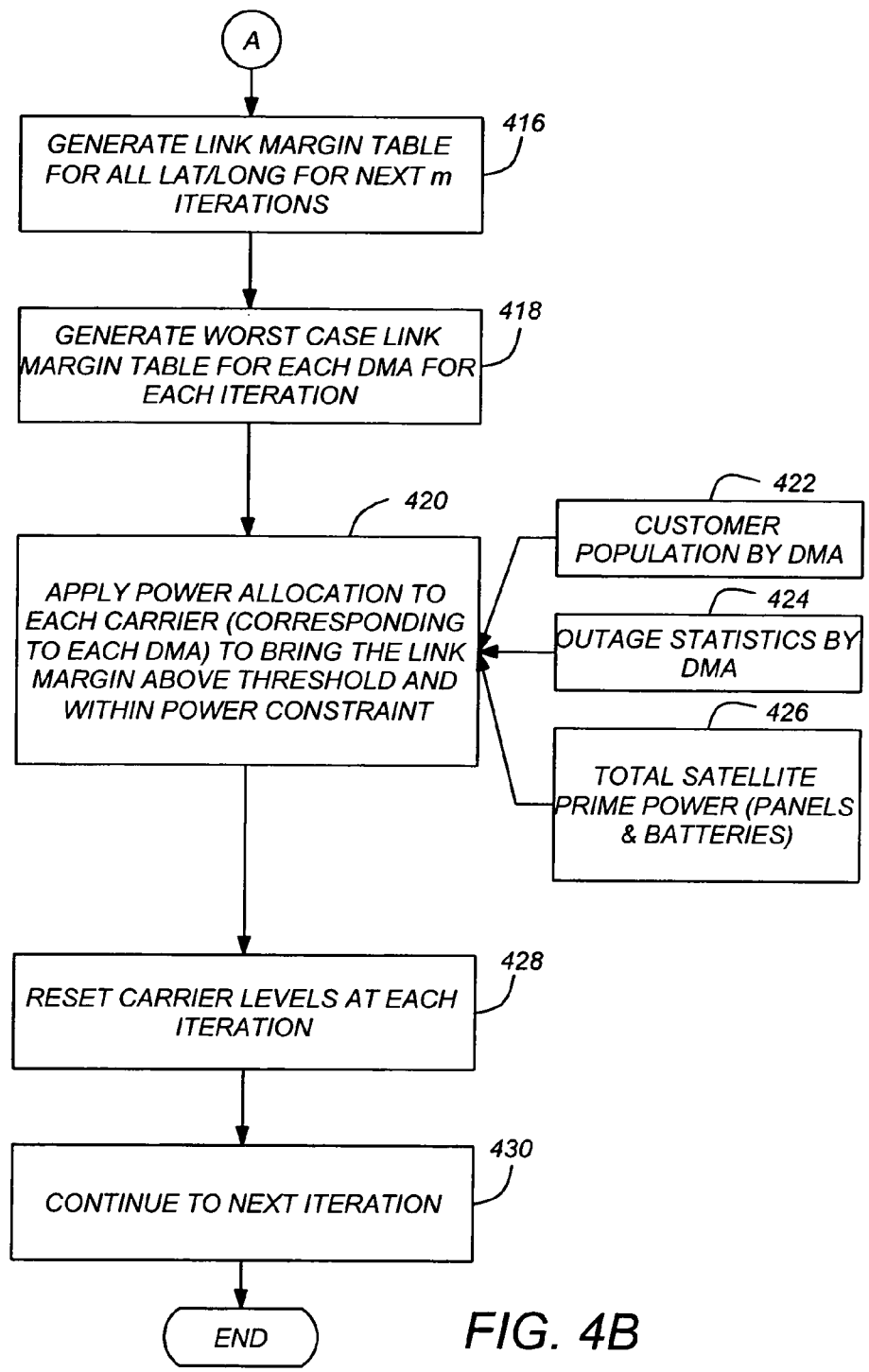

FIGS. 4A and 4B are flowcharts further presenting exemplary method steps used to practice the present invention. As shown in blocks 402 and 404, weather data is acquired and converted into a table or similar representation providing precipitation rate versus the latitude and longitude. In one embodiment, this information is obtained periodically and used to alter the transmission signal 118 as described below. In another embodiment, this information is examined to determine whether there are sufficient data changes to warrant a re-examination of transmission signal 118 power levels before such processing commences. The latency of the data obtained should be appropriately limited so that the information is useful in predicting signal propagation characteristics in the regions of interest In one embodiment the precipitation data has a nominal data latency of about 15 minutes.

Next, using geographic/geometric data such as the given sub-region altitude above sea level and an atmospheric propagation model such as CRANE, an estimate is generated of the line-of-sight attenuation of the transmit signal between the satellite 108 and subscribers 110 in the sub-regions. Additionally, based on the signal attenuation, an estimate is made of the increase in sky temperature of the subscriber antennae.

Next, using the attenuation and sky temperature estimates, the corresponding link margin for particular locations of interest is determined, as shown in block 408. In one embodiment, this is performed by combining the rain rate or intensity information described above with a computed or pre-stored representation of the relationship between the rain rate and the link margin for each location, which is shown in block 406. The rain rate/link margin relationship can be described in a table, in a closed form expression equation, or can be determined by iterative computations.

The values for the link margin for each location can also be precomputed and stored in a table. Each location's level of rain intensity can then be categorized into a rain intensity step, and the associated rain fade estimate can be found by table lookup and interpolation. This embodiment is possible because the resolution of the estimate of the rain intensity typically requires only a few levels or steps, and the geometry for a given location's latitude and longitude is fixed (the satellites 108 are typically in geosynchronous or geostationary orbits).

Next, as shown in block 410, areas of high rain intensity (storms) are identified. This may be accomplished with the use of well-known pattern recognition algorithms, which identify "closed" regions from the link margin information as corresponding to storm activity. Tracking and prediction algorithms can be used to predict storm movement across regions and sub-regions as shown in block 414. To assist in this determination, a storm "object" database having storm information for the last n hours can be provided, as shown in block 412. Storm tracking information may include, for example, the speed and direction of the storm. Similar objects (i.e. objects with approximately the same propagation characteristics) may be grouped together into larger objects to simplify processing. Predictions of propagation characteristics for time intervals in the future may also be generated. In one embodiment, propagation characteristics are generated in one minute intervals for a total of fifteen minutes, and are stored as a grid of link margin values for each latitude and longitude location at each iteration for the next m iterations. This is illustrated in block 416.

Next, as shown in block 418, the worst case link margin is determined for each area of interest (region, sub-region, or DMA) and for each iteration. A transmission signal algorithm is then applied to determine the desired transmission signal change necessary to improve the link margin.

In one embodiment, the carrier power of the transmitted signal is adaptively modified to account for the time-varying propagation characteristics of the transmitted signal. In this embodiment, a power allocation algorithm is then applied to determine the desired power setting for each carrier used in the transmission signal, as shown in block 420. The power allocation algorithm may also determine the desired power setting based on auxiliary information such as information regarding the subscriber population and/or outage statistics by region, sub-region, or DMA, and/or the total available satellite signal transmission capacity (for example, in terms of total satellite prime power) as shown in blocks 422-426. The power information assures that the selected carrier power is within the maximum power capabilities of the satellite, and the customer and outage statistics assure that the available power is used to provide the best signal to the greatest number of subscribers. Power information may include not only instantaneous power availability, but predicted power availability due to time-varying effects such as that which occurs when the satellite 108 is in the Earth's shadow and the solar panels become ineffective. In another embodiment, the transmitted signal algorithm determines the transmit antenna gain distribution over CONUS, the region or sub-region, etc., or the type of FEC coding that is applied to each signal. Further, the transmitter power and/or beamwidth (or other transmitted signal characteristic) can also be controlled according to the auxiliary information alone. This can be accomplished by receiving information describing a time varying transmission signal requirement such as the subscriber population, transmission signal outage and/or satellite signal transmission capacity, and generating the transmission signal according to the time-varying transmission signal requirement.

Next, the desired transmitted signal characteristic (computed by the transmission signal algorithm) is applied to the transmitted signal, as shown in block 428. In one embodiment, the transmission signal algorithm is computed at a ground station and the signal changes are also applied at the ground station. For example, when the satellite 108 includes frequency-translation transponders, the transmission signal characteristic can be controlled by controlling the power of the signal transmitted from the uplink station to the satellite 108. Alternatively, the power level of the transmission signal can be controlled by transmitting commands from the uplink station to the satellite 108 to control the power amplifiers and/or attenuators internal to the satellite 108. In another embodiment, the necessary computations are performed at the ground station and signal changes are made on the ground and/or and in the satellite 108. Additionally, all computations and signal changes could be accomplished on board the satellite 108.

The foregoing information can be transmitted to the satellite 108 (or merely applied to the transmitted signal) on a periodic or aperiodic basis. In one embodiment, the desired characteristics of the transmission signal are computed every sixty seconds, and transmitted to the satellite at each iteration. In another embodiment, the desired transmission signal characteristics are computed at a given interval, but transmitted to the satellite 108 only if there is a sufficient change in the desired transmission characteristics from the previous value. Finally, the foregoing steps are repeated to determine the desired transmission signal characteristics for the next iteration, as shown in block 430.

Figure 5:
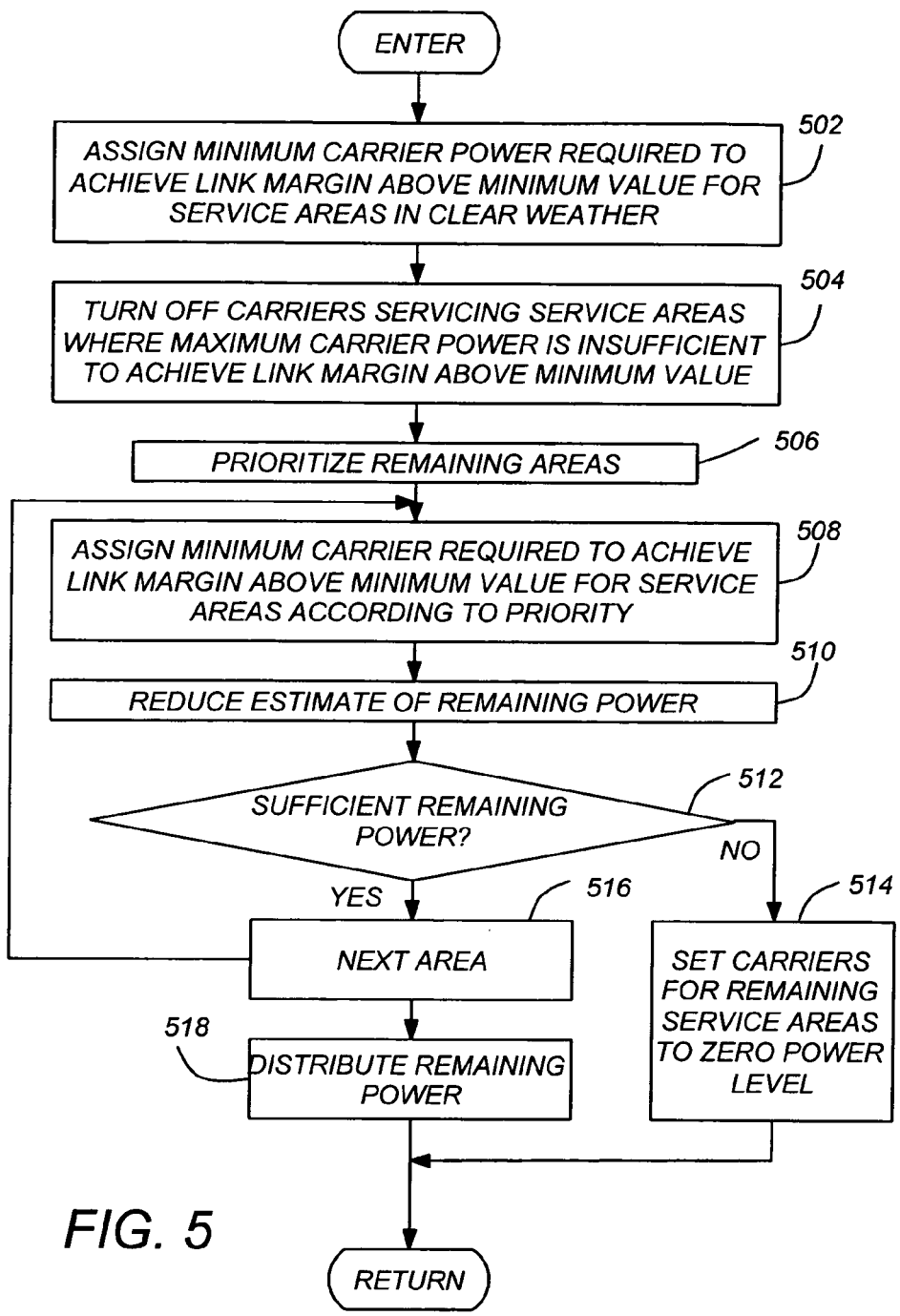
FIG. 5 presents a flow chart illustrating exemplary method steps used to allocate power to each transmission signal.

FIG. 5 is a flow chart illustrating one embodiment of method steps in block 420 used to compute the desired characteristics of the transmission signal. The minimum carrier power level required to achieve a link margin above what is required for a particular service quality is determined. This carrier power level is then assigned to service areas (including the regions, sub-regions, and DMAs) which are not experiencing signal propagation problems (i.e. those which are in clear weather), as depicted in block 502. Service areas experiencing signal propagation phenomena such that even the maximum carrier power is insufficient to provide a minimum signal quality (i.e. areas of severe storm activity) are also identified. Transmission signals and/or carriers to these areas are interrupted, turned off, or otherwise disabled, thus saving satellite 108 power for other service areas, as shown in block 504.

Next, the remaining service areas are prioritized, as shown in block 506. In one embodiment, this is accomplished by preparing a list of service areas (or the transmission signal carriers for the service area), in which the list of entries are ordered from the highest priority service areas to the lowest priority service areas. The service areas can be prioritized by subscriber population (with larger populations having a higher priority); by statistical availability over a preceding time interval (e.g. 1 year) (with service areas with lower statistical availability having a higher priority), service area subscriber population weighted by unavailability over a preceding time interval (with larger populations given a higher priority), by power demand (with those service areas requiring less power granted higher priority), or combination of the above. The desired priority scheme can be selected by the operator.

In one embodiment of the present invention, authorized customers within a given region, sub-region, or DMA are assumed to have a uniform geographic distribution. Further, the present invention may increase the transmission signal 118 power above the clear weather value when an estimate of the number of affected subscribers exceeds a specified value. The number of affected subscribers can be determined, for example, from the average density of customers in a particular region, sub-region or DMA and the size of the storm or other disturbance. Hence, with knowledge of the number of affected subscribers, the power management algorithm can be used to maximize the number of receivers (subscriber population) that are at or above a minimum link margin, given the system constraints on spacecraft power and link information rates.

Next, in accordance with the prioritization described in block 506, each of the remaining service areas (excluding those addressed in blocks 502 and 504) are assigned a transmission signal with a minimum carrier strength required to achieve the desired link margins. This is illustrated in block 508. In the embodiment where prioritization is expressed by ordering the service areas from high to low priority, and the foregoing assignment is performed by allocating a transmission signal with sufficient carrier strength to achieve the required link margin to the first area in the ordered list, and reducing 510 an estimate of the remaining power available for other areas. Then, a transmission signal with sufficient carrier strength to the second area on the ordered list, and the estimate of the remaining power available for other areas is again reduced.

The strength of the transmission signals selected above represent the minimum margin above a threshold to achieve a particular reception quality during a rain fade event. Typically, the minimum reception quality excludes "freeze-frame" effects and other similar artifacts.

A check is made to determine if sufficient power remains 512. If not, the carriers for the remaining service areas are set to zero. If there is sufficient remaining power, and there are additional service areas that must be allocated a transmission signal, processing returns to step 508. If all service areas have already received their allocated transmission signal power, processing proceeds to block 518, where the remaining power (unallocated) is distributed among the service areas. This can include an equal allocation among active service areas, or a weighted average according to the power already allocated to the area in step 508.

The foregoing process steps are periodically or aperiodically repeated so that the transmission signal 118 power is adjusted to account for the time-varying propagation characteristic of interest. In one embodiment, the power is adjusted every 60 seconds. In another embodiment, the power is adjusted aperiodically, or when the content of the storm information indicates that a power adjustment is required.

The transmission signals 118 can be adjusted by commanding output level adjustment attenuators on the satellite 108 itself, or by providing commands to uplink carrier adjustment equipment at each uplink site 104. In one embodiment, commands to reduce certain transmission signal 118 power levels are transmitted and acknowledged before commands are set to increase power on other carriers to assure that the total satellite prime power demand is not exceeded. The transmission signal power level adjustment can be continuous or in a finite number of steps. For example, the power level may be adjusted in nine 1.0 dB steps, or set to zero.

In one embodiment, a database comprising information regarding the DC power required for each output power setting for each transmitter may be maintained and used to compute a total DC power requirement. This database can be used in performing the steps illustrated in FIG. 5. A daily estimate of the DC power available can obtained from this database.

Figure 6:
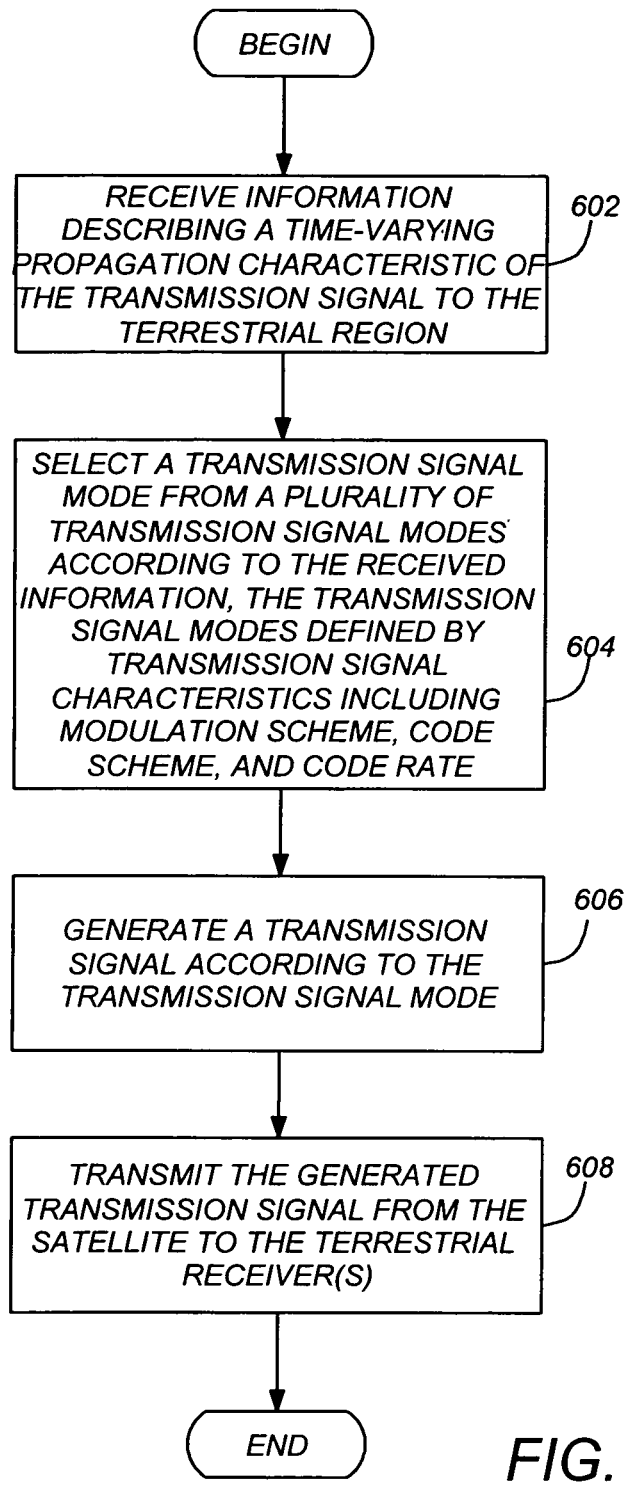
FIG. 6 is a diagram presenting illustrative method steps that can be used to practice another embodiment of the present invention.

FIG. 6 is a diagram presenting another embodiment of the present invention. In this embodiment, a plurality of transmission modes are defined, and one or more of these transmission modes are selected based on the information describing the time-varying propagation characteristic of the transmission signal in the terrestrial region of interest. In block 602, information describing the time-varying propagation characteristic of the transmission signal in the terrestrial region is received. As described above, this can be accomplished in a number of ways, including by use of externally generated information (for example, by public information such as that which is available from the National Oceanic and Atmospheric Association, from remote sensors mounted in the terrestrial region of interest, or by receiving information from the terrestrial receivers themselves.

In block 604, a transmission signal mode is selected from a plurality of transmission signal modes, based at least in part on the information received in block 602. The transmission signal modes are defined according to transmission signal characteristics, which may include the modulation scheme, the error-correcting coding scheme, and the code rate.

FIG. 7 presents a table showing exemplary transmission signal modes. In this example, each mode is characterized by a modulation type, coding scheme, and code rate, and a modem implementation error of 0.5 dB or less is assumed. The second column of the table describes the modulation scheme of the transmission signal mode. In the illustrated embodiment shown in FIG. 7, quadrature phase shift keying (QPSK) modulation or 8PSK modulation is employed. The third column describes the coding scheme used in the transmission signal mode. In this example, all the transmission signal modes employ Low Density Parity Check and Bose, Chaudhuri and Hocquenghem (LDPC+BRH) coding. Other coding schemes may also be used. The next column describes the inner code rate used for the LDPC code. The code rate is the ratio of data bits to total bits transmitted in the code words of the transmitted signal. A high code rate (e.g. the 9/10 code rate shown in FIG. 7) means information content is high and coding overhead is low. However, since fewer bits are used for coding redundancy, the high code rates are less able to correct transmission errors. The next three columns describe the symbol rate (in megasymbols per second), the payload rate in bits per symbol and the payload rate in megabits per second. Note that the transmission modes have been defined such that the payload rate is adjustable in substantially uniform and equally-spaced steps between 19.78 and 53.58 megabits per second. The use of multiple modulation schemes, coding schemes, and coding rates allows sufficient adjustment precision so that the required link margin can be achieved without substantially exceeding it, allowing as much additional data to be provided as possible when atmospheric conditions permit.

The next two columns of data in FIG. 7 illustrates the carrier to noise ratio (CNR) required for quasi error-free (QEF) reception for each transmission mode. The code-only column refers to a situation wherein the channel impairment includes added white Gaussian noise (AWGN) only, whereas modem back-to-back column also adds modem implementation errors that include timing and carrier recovery inaccuracies. For example, mode 10 (an 8PSK modulation scheme with LDPC+BCH coding scheme and an inner code rate of 2/3) requires an extra 5.6 dB of CNR over mode 1 (a QPSK modulation scheme with the same coding scheme and a code rate of 1/2) to achieve the same QEF modem back-to-back performance (7.1 dB versus 1.5 dB), but also nearly doubles the throughput (38.71 versus 19.78 Mbits/second). Transmission capacity is decreased by using lower transmission signal modes (which have lower order modulation and/or code rate) when atmospheric conditions require it, and higher transmission signal modes (higher order modulation and/or code rates) under clear sky conditions, the selection of which depending on the worst case CNR available in the beam at that time.

In block 606, a transmission signal is generated according to the transmission mode selected in block 604, and in block 608, the generated signal is transmitted to the terrestrial receiver 112.

In one embodiment, different signal modes can be used for transmitting data of different priorities. For example, a first transmission signal mode (e.g. Mode No. 1 in FIG. 7) can be used to transmit only high priority data during difficult atmospheric conditions, and a second transmission signal mode (e.g. Mode No. 14) can be used to transmit the both the high priority data as well as lower priority data during clear sky conditions. Typically, the high priority data includes baseline service data (e.g. program guides and basic service media programs transmitted at minimal resolution), and the lower priority data includes enhanced service data. Such lower priority data can include additional data to provide improved video and/or audio quality (e.g. by providing HDTV or simply a signal with a higher peak signal to noise ratio), early delivery of additional program guide (APG) carousel bits, additional channels of information such as guide channels or other free channels, or infomercial channels. The lower priority data can also include media programs or beginning portions of media programs transmitted to the terrestrial receiver 112 to be background recorded on a digital video recorder (DVR) or similar device (e.g. portable MP3 player) for later selection and playback. The lower priority data may also include data which is not necessarily less important than the high priority data, but data which does not need to be immediately transmitted and received (e.g. real-time data versus non-real-time data). This might include, for example, data which updates the configuration or operation of the terrestrial receiver 112.

The relationships shown above describe a range of adaptation for CNRs under noise-limiting conditions. However, the selection of the transmission mode and power level can also be dependent upon other factors. For example, where spot beams are used, the geometry and layout of some of the spot beams may be more subject to co-channel interference (CCI) than others. Such beams may require different or higher order coding schemes than would otherwise be the case, higher transmission signal power, or both.

Selection of different transmission signal modes raises the possibility of temporary interruptions or "glitches" in the presentation of the media programs to the subscriber. Such glitches can be minimized by judiciously timing the transition from one transmission signal mode to another. For example, the media programs being transmitted by the transmission signal typically include a plurality of transitions, whether the transitions be from one scene to another, from the media program to a commercial, or otherwise. Glitches in the presentation of the media program that occur during such times are less undesirable than glitches that occur in the middle of a scene. Therefore, the timing of the transmission signal mode changes can be controlled so that the transitions occur during such media program transitions. Where a particular transmission signal includes media program information for only a single program (as may be the case with HDTV programs), the selection of the timing of the mode transition is relatively straightforward. In cases where the transmission signal includes information regarding multiple media programs, the selection of the timing of the mode transition may be more difficult, as more than one media program must be considered. Still, it is typical for major transitions to be largely synchronized across all media programs. For example, virtually all media programs transmitted on all channels undergo a transition at or near precisely 8 PM. This information can be used to effect a transmission signal mode transition at a time when it is least undesirable.

Another method of dealing with such transitions involves the use of a circular buffer that has sufficient memory and processing capabilities to store the incoming media program, process the incoming media program to ameliorate the appearance of any glitches, and to play back the media program after such processing have been made. This can be accomplished via a special purpose random access memory and processor in the terrestrial receiver 112 itself, or by use of the concurrent recording/playback capabilities available with a digital video recorder communicatively coupled to the terrestrial receiver.

The present invention also uses adaptive power control in conjunction with the selectable signal transmission modes described above. This permits a the system to select a signal transmission mode and power level to provide the precise CNR that is required to deliver the service with the required quality. For example, if atmospheric conditions allow a CNR modem B-B operation of 8.1 dB, reference to FIG. 7 illustrates that transmission signal mode 11 (8PSK, LDPC+BCH, 3/4 coding) cannot be used, as it requires a CNR modem B-B of 8.4. This transmission mode can nonetheless be used if the carrier power of the signal is adjusted upwards to provide the necessary CNR. The same is true in the other direction. For example, if atmospheric conditions allow a CNR modem B-B operation of 7.5 dB, the transmitter mode can be selected to allow a reduction in the carrier power of the transmitted signal, and the power that is not expended for that transponder may be used in others instead.

Since adjustments in the power of the transmitted signal does not typically result in any glitches in the received signal. The present invention may also use adaptive power control to ameliorate the effect of degraded propagation characteristics between transmission signal mode transitions. For example, if unexpected heavy rain begins to occur in a particular sub-region that had been receiving a transmission signal with baseline service data as well as enhanced service data (for example, using transmission signal mode 14,) the system may increase the power of the signal transmitted to the sub-region until a suitable media program transition occurs, at which time, the transmission signal mode may be reduced (e.g. to mode 8) with the signal power returned to a nominal or decreased value as required for sufficient margin.

Figure 8:
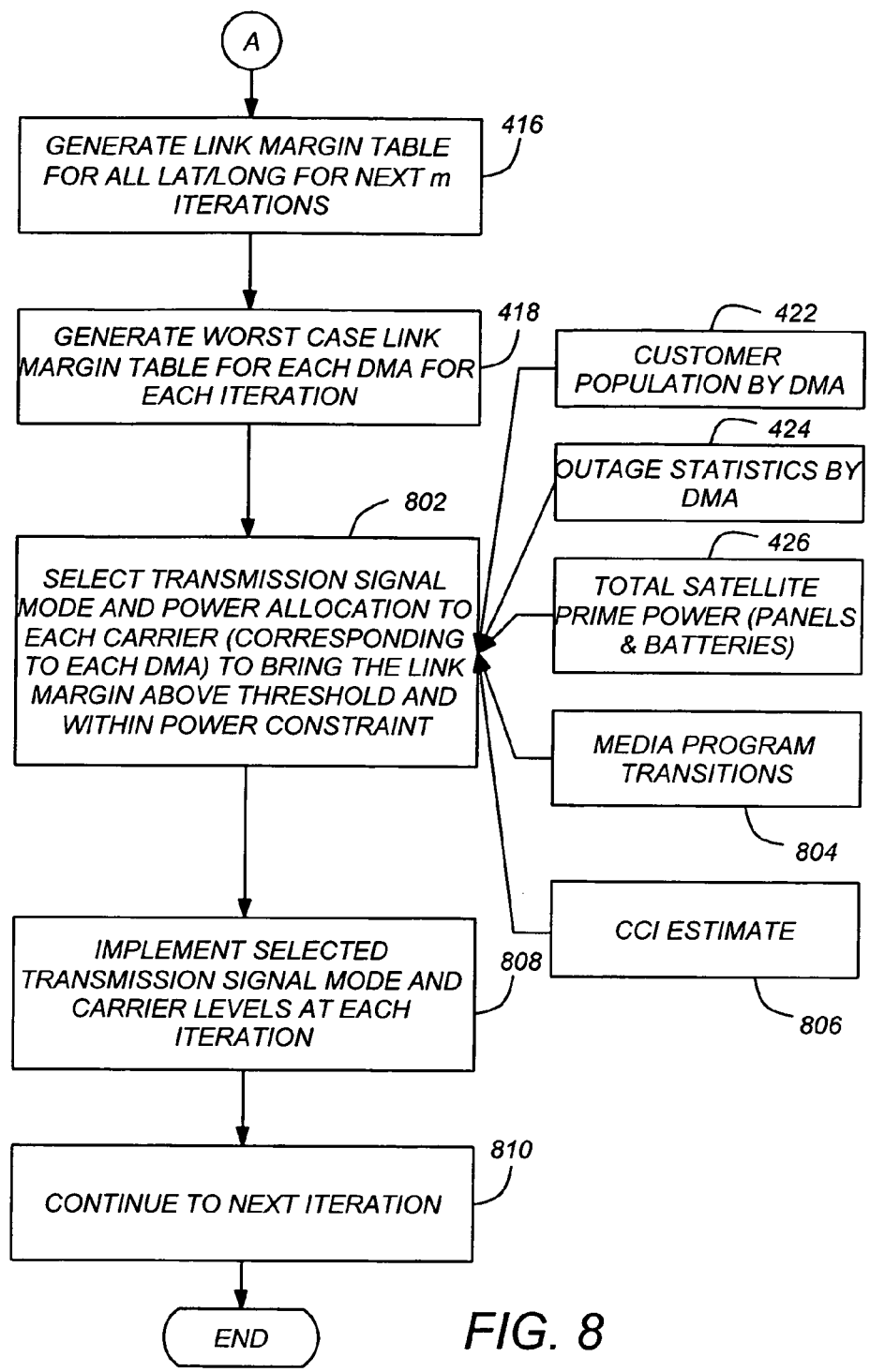
FIG. 8 is a diagram illustrating how transmission signal modes can be used in the present invention.

FIG. 8 is a diagram illustrating the implementation of the foregoing embodiments. First, weather data can be acquired and processed as described in FIG. 4A and the accompanying text. Then, link margin tables are generated as described in blocks 416 and 418 of FIG. 4A, and reproduced in FIG. 8. This information is used to select a transmission signal mode and a power allocation to each carrier to bring the link margin above the threshold and within the system power constraints, as shown in block 802. This can be accomplished using data described in any one or all of the customer population by DMA shown in block 422, the outage statistics by DMA shown in block 424, the total satellite prime power shown in block 426, media program transitions shown in block 804, and CCI estimates shown in block 806. The selected transmission signal mode and carrier power levels are implemented at each iteration, as shown in block 808. Processing continues to the next iteration, as shown in block 810.

Figure 9:
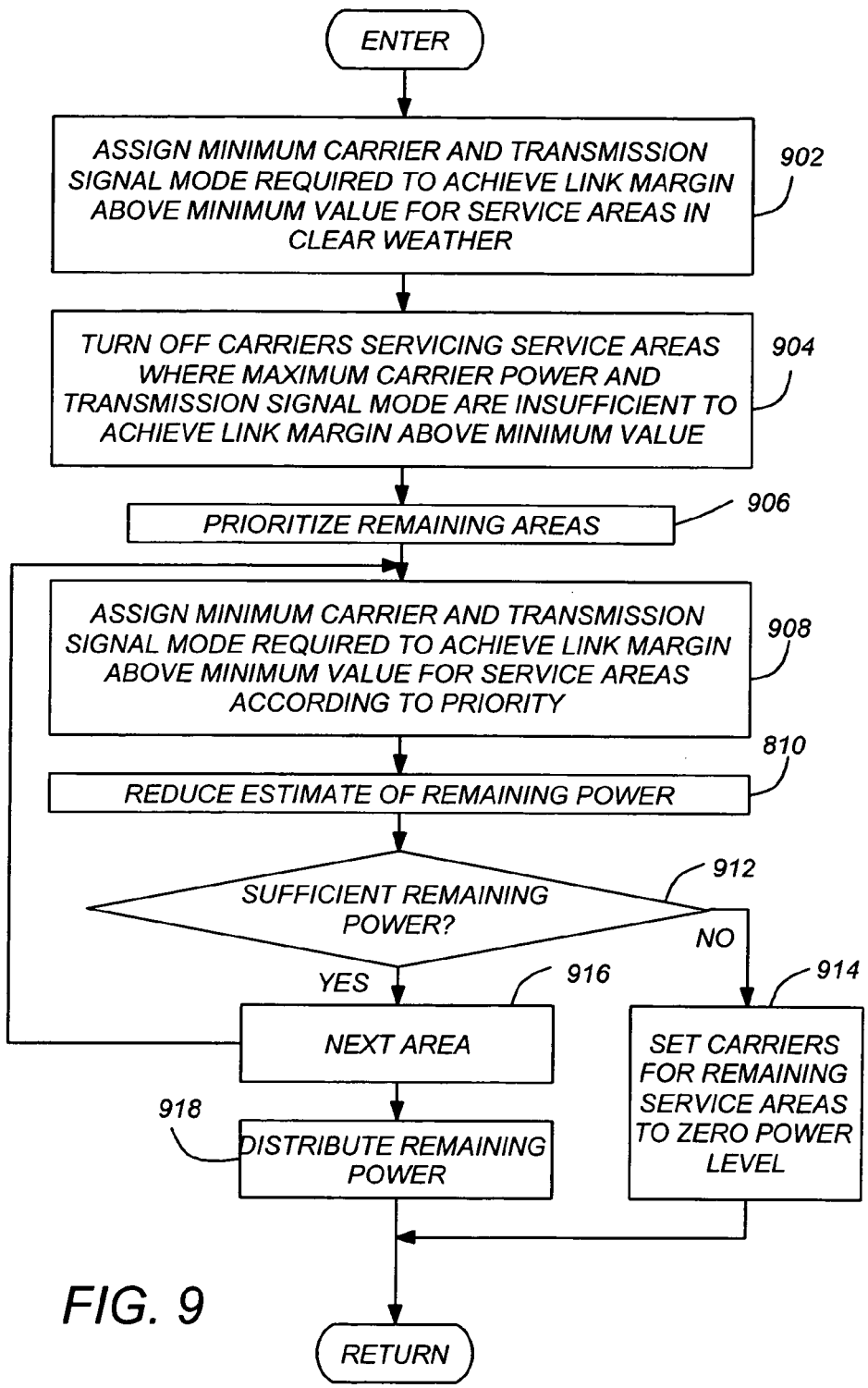
FIG. 9 is a diagram illustrating steps that can be used to select the transmission signal mode and power allocation.

FIG. 9 is a diagram illustrating steps that can be used to perform the operations described in block 702 of FIG. 8 to select the transmission signal mode and power allocation.

The steps illustrated in FIG. 9 are analogous to those presented in FIG. 5 above, except those of blocks 902, 904, and 908. The processing of those blocks considers not only the carrier power in performing the adaptive transmission control, but also the transmission signal mode. In particular, the operations described in block 908 can include the techniques described above to select a signal transmission mode and power level to provide the precise CNR that is required to deliver the service with the required quality.

Figure 10:
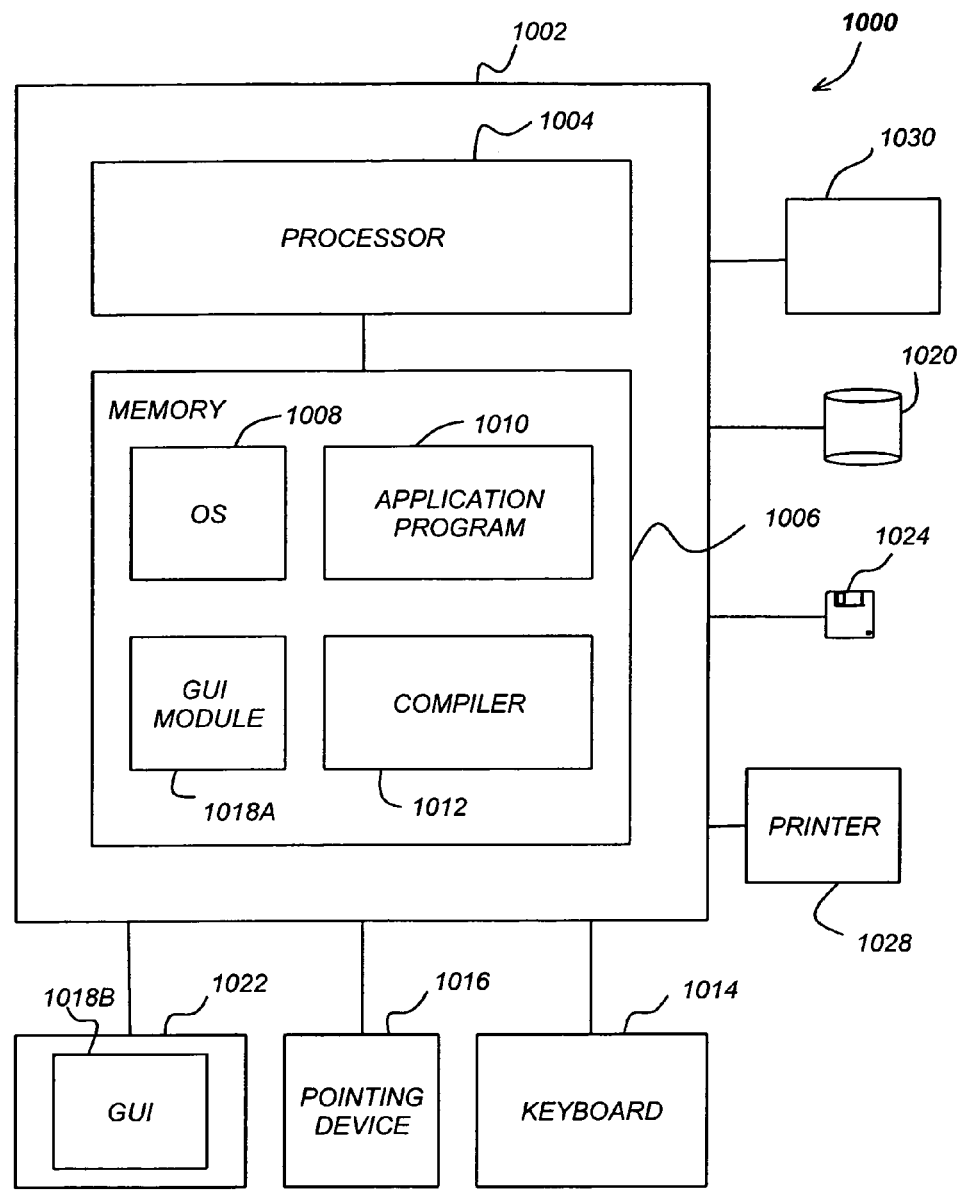
FIG. 10 is a diagram presenting an exemplary hardware environment usable in practicing the present invention.

FIG. 10 illustrates an exemplary computer system 1000 that could be used to implement the present invention. The computer 1002 comprises a processor 1004 and a memory, such as random access memory (RAM) 1006. The computer 1002 may also be operatively coupled to a display 1022, which presents images such as windows to the user on a graphical user interface 1018B. The computer 1002 may be coupled to other devices, such as a keyboard 1014, a mouse device 1016, a printer, etc. Of course, those skilled in the art will recognize that any combination of the above components, or any number of different components, peripherals, and other devices, may be used with the computer 1002.

Generally, the computer 1002 operates under control of an operating system 1008 stored in the memory 1006, and interfaces with the user to accept inputs and commands and to present results through a graphical user interface (GUI) module 1018A. Although the GUI module 1018A is depicted as a separate module, the instructions performing the GUI functions can be resident or distributed in the operating system 1008, the computer program 1010, or implemented with special purpose memory and processors. The computer 1002 may also implement a compiler 1012 which allows an application program 1010 written in a programming language such as COBOL, C++, FORTRAN, or other language to be translated into processor 1004 readable code. After completion, the application 1010 accesses and manipulates data stored in the memory 1006 of the computer 1002 using the relationships and logic that was generated using the compiler 1012. The computer 1002 also optionally comprises an external communication device such as a modem, satellite link, Ethernet card, or other device for communicating with the devices controlling the transmission signal.

In one embodiment, instructions implementing the operating system 1008, the computer program 1010, and the compiler 1012 are tangibly embodied in a computer-readable medium, e.g., data storage device 1020, which could include one or more fixed or removable data storage devices, such as a zip drive, floppy disc drive 1024, hard drive, CD-ROM drive, tape drive, etc. Further, the operating system 1008 and the computer program 1010 are comprised of instructions which, when read and executed by the computer 1002, causes the computer 1002 to perform the steps necessary to implement and/or use the present invention. Computer program 1010 and/or operating instructions may also be tangibly embodied in memory 1006 and/or data communications devices 1030, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

FIG. 11 is a diagram of an exemplary receiver 112 that can be used to receive the signals transmitted by the video distribution network 200. In this embodiment, the exemplary receiver 112 is a media program receiver 1100 that receives media programs such as movies and music.

The receiver 1100 comprises a tuner/demodulator 504 communicatively coupled to an ODU 1101 having one or more LNBs 1102. The LNB 1102 converts the downlink 118 signal from the satellites 108 to, a signal required by the receiver's tuner/demodulator 1104. The LNB 1102 may provide either a dual or a single output. The single-output LNB 1102 has only one RF connector, while the dual output LNB 1102 may have two RF output connectors and can be used to feed a second tuner 1104, a second receiver 1100 or some other form of distribution system.

The tuner/demodulator 1104 isolates receives the signal from the satellite 108 and converts the modulated data to a digital data stream. Since the receiver 1100 could be called upon signals varying in a variety of characteristics including modulation type (QPSK and 8PSK, or higher order schemes for example) and inner code rates, the tuner/demodulator includes an adaptive controller 1105. The adaptive controller 1105 controls the tuner/demodulator in order to receive the adaptively transmitted signal.

In one embodiment, the adaptive controller 1105 determines how to configure the tuner/demodulator 1104 from the received signal itself. This can be accomplished, for example, by configuring the tuner/demodulator 1104 to receive a signal using candidate combination of signal characteristics, and determining whether a signal has been received using the candidate characteristics. If it is determined that the signal is being received, the adaptive controller 1105 sets the tuner/demodulator 1104 parameters to receive a signal having the candidate combination of signal characteristics. If it is determined that the signal is not being received, the adaptive controller 1105 selects another candidate combination of signal characteristics, and again determines whether a signal is being received. This process continues until the tuner/demodulator 1104 is properly configured to receive the transmitted signal. The selection of candidate combination of signal characteristics can be made from an ordered list to permit the adaptive controller 1105 to quickly determine the proper tuner/demodulator 1104 settings. For example, if the system transmitting the signal normally uses mode number 14 in FIG. 7, then descends to each lower mode as required, the receiver 1100 can be programmed to select the same modes in the same order.

Different techniques can be used to determine whether the signal is being received. One technique is to determine the bit error rate (BER) of the received signal. Another would be to determine whether phase lock has been achieved on the signal. Another would be to periodically include lock information in the transmitted signal, and allow the receiver 1100 to check to determine whether that information has been received. Still another would be to check the auto or cross correlation of the received data and to determine whether the signal is being received from this data.

In another embodiment, the adaptive controller 1105 determines how to configure the tuner/demodulator 1104 from a signal other than the information signal. This signal can be received on a separate channel from the same or different transponder or satellite, can be received via the modem 1140 or any other source.

The adaptive controller 1105 may be functionally incorporated within the tuner/demodulator 1104, or may be implemented separately. The adaptive controller 1105 may also be implemented by the microcontroller 1110.

The digital data stream from the tuner/demodulator 1104 is supplied to a forward error correction (IEC) decoder 1106. This allows the receiver 1100 to reassemble the data transmitted by the uplink center 104 (which applied the forward error correction to the desired signal before transmission to the receiver 1100) verifying that the correct data signal was received and correcting errors, if any. The error-corrected data may be fed from the FEC decoder module 1106 to the transport module 508 via an 8-bit parallel interface. The FEC decoder module 1106 may also be incorporated into the tuner/demodulator 1104, and may be controlled by the adaptive controller 1105.

The transport module 1108 performs many of the data processing functions performed by the receiver 1100. The transport module 1108 processes data received from the FEC decoder module 1106 and provides the processed data to the video MPEG decoder 514 and the audio MPEG decoder 1116. In one embodiment of the present invention, the transport module, video MPEG decoder and audio MPEG decoder are all implemented on integrated circuits. This design promotes both space and power efficiency, and increases the security of the functions performed within the transport module 1108. The transport module 1108 also provides a passage for communications between the microcontroller 1110 and the video and audio MPEG decoders 1114, 1116. As set forth more fully hereinafter, the transport module also works with the conditional access module (CAM) 1112 to determine whether the receiver 1100 is permitted to access certain program material. Data from the transport module can also be supplied to external communication module 1126.

The CAM 1112 functions in association with other elements to decode an encrypted signal from the transport module 1108. The CAM 1112 may also be used for tracking and billing these services. In one embodiment of the present invention, the CAM 512 is a smart card, having contacts cooperatively interacting with contacts in the receiver 1100 to pass information. In order to implement the processing performed in the CAM 1112, the receiver 1100, and specifically the transport module 1108 provides a clock signal to the CAM 1112.

Video data is processed by the MPEG video decoder 1114. Using the video random access memory (RAM) 1136, the MPEG video decoder 1114 decodes the compressed video data and sends it to an encoder or video processor 1115, which converts the digital video information received from the video MPEG module 1114 into an output signal usable by a display or other output device. By way of example, processor 1115 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if ATSC high definition programming is processed.

Audio data is likewise decoded by the MPEG audio decoder 1116. The decoded audio data may then be sent to a digital to analog (D/A) converter 1118. In one embodiment of the present invention, the D/A converter 1118 is a dual D/A converter, one for the right and left channels. If desired, additional channels can be added for use in surround sound processing or secondary audio programs (SAPs). In one embodiment of the invention, the dual D/A converter 1118 itself separates the left and right channel information, as well as any additional channel information. Other audio formats such as DOLBY DIGITAL AC-3 may similarly be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 1110 receives and processes command signals from the remote control 1124, an receiver 1100 keyboard interface, and/or another input device. The microcontroller receives commands for performing its operations from a processor programming memory, which permanently stores such instructions for performing such commands. The processor programming memory may comprise a read only memory (ROM) 1138, an electrically erasable programmable read only memory (EEPROM) 1122 or, similar memory device. The microcontroller 1110 also controls the other digital devices of the receiver 1100 via address and data lines (denoted "A" and "D" respectively, in FIG. 5).

The modem 1140 connects to the customer's phone line via the PSTN port 1103. It calls, e.g. the program provider, and transmits the customer's purchase information for billing purposes, and/or other information. The modem 1140 is controlled by the microprocessor 1110. The modem 1140 can output data to other I/O port types including standard parallel and serial computer I/O ports.

The present invention also comprises a local storage unit such as the video storage device 532 for storing video and/or audio data obtained from the transport module 1108. Video storage device 1132 can be a hard disk drive, a read/writeable compact disc of DVD, a solid state RAM, or any other storage medium. In one embodiment of the present invention, the video storage device 1132 is a hard disk drive with specialized parallel read/write capability so that data may be read from the video storage device 532 and written to the device 532 at the same time. To accomplish this feat, additional buffer memory accessible by the video storage 1132 or its controller may be used. Optionally, a video storage processor 1130 can be used to manage the storage and retrieval of the video data from the video storage device 1132. The video storage processor 1130 may also comprise memory for buffering data passing into and out of the video storage device 1132. Alternatively or in combination with the foregoing, a plurality of video storage devices 1132 can be used. Also alternatively or in combination with the foregoing, the microcontroller 1110 can also perform the operations required to store and or retrieve video and other data in the video storage device 1132.

The video processing module 1115 output can be directly supplied as a video output to a viewing device such as a video or computer monitor. In addition the video and/or audio outputs can be supplied to an RF modulator 1134 to produce an RF output and/or 8 vestigal side band (VSB) suitable as an input signal to a conventional television tuner. This allows the receiver 500 to operate with televisions without a video input.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the receiver 1100 also receives and stores a program guide in a memory available to the microcontroller 1110. Typically, the program guide is received in one or more data packets in the data stream from the satellite 108. The program guide can be accessed and searched by the execution of suitable operation steps implemented by the microcontroller 510 and stored in the processor ROM 1138. The program guide may include data to map viewer channel numbers to satellite networks, satellite transponders and service channel identifications (SCIDs), and also provide TV program listing information to the subscriber 122 identifying program events.

The functionality implemented in the receiver 1100 depicted in FIG. 5 can be implemented by one or more hardware modules, one or more software modules defining instructions performed by a processor, or a combination of both.

Alternative Embodiments

Different Service Classes:

The present invention can also be practiced with a system having several classes of service each with a different quality of service (QoS). For example, although entertainment television or "real-time" data delivery often requires an annualized average link availability of 99.8%, other data (e.g. data that is repetitively broadcast and whose latency is not temporally significant) may have reduced availability requirements (e.g. 99.5%). One example of such a service is the overnight delivery of an electronic newspaper. Since the subscriber is not reading the newspaper in real time, the data may be unavailable for short periods and still achieve the ultimate objective of delivering the data before a certain time. In such cases, the subscriber would be unaware that occasionally, due to rain, an extra transmit cycle is needed to properly store the complete newspaper.

Reduction of Transponder Power to Simplify Satellite Design:

The satellites 108 used to transmit the signals described above typically obtain power from two sources: (1) solar panels, and (2) batteries. Battery power is normally used during periods where the Earth eclipses the sun and shades the satellite's 108 solar panels.

The total power availability is an important and limiting characteristic of communications satellite design. Typically, it is assumed that all communications transmitters on a communications satellite must operate continuously at their maximum rated level. Consequently, the prime solar panel power determines the maximum total available transmitting power of the transmission signal (typically determined by the carrier power).

The present invention allows some transmitters to be operated at lower power levels, especially in situations where it is known that all locations within the coverage region have excess link margin. Further, because additional prime power can be made available in cases when a number of transmitters are frequently operated at reduced power levels, the present invention permits the use of additional transmitters.

In other embodiments, power not required in a region may be used to charge batteries to store energy, which may then be used to supplement power obtained from solar panels when needed (e.g. when the total desired transmission power exceeds for short periods the available output of the solar panels).

In other embodiments, the present invention can also be used to simplify satellite 108 design. For example, a full complement of batteries would not be required where some carriers could be reduced or the carriers turned off during the eclipse periods when the batteries are normally utilized. The cost and weight of the batteries saved could be devoted to other purposes.

Real-Time Changes in Error Control Coding:

Typically, a digital transmission signal 118 is forward error control (FEC) coded. In some applications, the FEC scheme includes a single data stream in each satellite transponder having two modes: (1) a high information rate mode (of e.g. 30.3 Mbps) and a lower information rate mode (of e.g. 23.6 Mbps). The high information rate mode requires a link carrier to noise spectral density approximately 3 dB better than the low information rate mode of 23.6 Mbps. These two modes are achieved by changing the convolutional code rate in the transmitted stream. All decoders in the subscriber's integrated receiver/decoders (IRDs) are designed to follow these code changes automatically. This allows most links to be routinely operated at 30.3 Mbps and re-configured to 23.6 Mbps if a storm was expected in the coverage area. For example, the (highly available) 23.6 Mbps capacity could be used for television and real-time information, and the (lower availability) 30.3 Mbps signal with an additional 6.7 Mbps of throughput made available when possible for non-real time or "cached" services.

In one embodiment of the present invention, the transmitted signal 108 includes a first information portion characterizable by a first priority (for example, real-time data) and a second information portion characterizable by a second priority (for example, non-real time data). In this embodiment, using the measured or predicted time-varying propagation characteristic, information is selected from the first information portion and the second information portion according to the first and second priority and the time-varying propagation characteristic. For example, higher priority data only may be transmitted to service areas affected by storm activity.

The present invention can be used to implement any combination of the foregoing improvements. This can be accomplished by segregating service into different service classes and determining the minimum transmission signal characteristics that are required for each class of service. If the standard transponder maximum power is selected by the satellite designer, a certain number of satellite transponders can be shut off or operated at a reduced power level, thus placing less demands on the satellite 108 prime power and battery capacity, and allowing for a simpler power subsystem design or use of the reserve power by other satellite subsystems. During operation, transmission signal carriers are dedicated to different service classes, and the FEC mode is selected to provide the greatest throughput for the required error quality and availability. Conversely, if all carriers must carry the services requiring the best error quality then the FEC mode of all carriers may be changed to this mode prior to the appearance of storms anywhere in the region. During clear weather over the entire region all carriers will be operated in a mode which supplies additional throughput. This excess throughput during clear weather is used for non-real-time services or any services that can be preempted during storms.

Adaptive Modulation Schemes:

To account for the time-varying propagation characteristic of the transmission signal, the present invention can also modify or select the modulation scheme (each of which permit a particular data rate under specified transmission conditions) used in transmission. For example, a phase shift keyed (PSK) modulation scheme may be utilized. PSK modulation schemes include signal constellations with a plurality of signal points arranged in a wide variety of constellations, including QPSK, 8-PSK, and 16-PSK. When such modulation schemes are used, the first modulation scheme can be, for example, a lower data rate modulation scheme such as QPSK, and the higher data rate modulation scheme can include 8, 16 or 32-PSK. Quadrature amplitude modulation (QAM) and variants thereof can also be used.

Combination of Transmission Characteristics:

Variations in the foregoing transmission characteristics can also be used in a number of combinations. For example, a technique can be employed in which a 16-QAM modulation scheme is used during low rain conditions, a QPSK is used during high rain conditions, and to which varying levels of FEC are applied as well. In this embodiment, the combined selection of the modulation and the FEC level(s) provide a greater number of channel coding alternatives.

Simultaneous Transmission of High Priority and Lower Priority Data:

The present invention can also be used to transmit high and lower priority data at the same time. In this embodiment, two or more levels of coding and/or modulation can be utilized in which the more robust coding carries the higher priority data only, and the less robust coding carries both the lower and higher priority data. The coding and/or modulation can then be varied according to the real or predicted weather, thus optimizing data transmission, increasing the availability (and the predictability of the availability) of the applicable portions of the data transmission.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of adaptively controlling a transmission signal for transmission to a receiver in a terrestrial region, comprising the steps of:

receiving information describing a time-varying propagation characteristic of the transmission signal in the terrestrial region;

selecting a transmission signal mode from a plurality of transmission signal modes according to the received information, the transmission signal modes defined by transmission signal characteristics including modulation scheme and code rate;

changing the transmission signal according to the selected transmission signal mode; and wherein the transmission signal comprises a media program having a transition and the timing of the change in the transmission signal according to the selected transmission signal mode is controlled to be made during the transition.

2. The method of claim 1, wherein the plurality of transmission signal modes includes:
   a first transmission signal mode for transmitting data having a first priority via the transmission signal when the information describing the time-varying propagation characteristic indicates that the transmission signal will be maximally attenuated by the time-varying propagation characteristic; and
   a second transmission signal mode for transmitting the data having the first priority and additional data having a lower priority than the first priority when the information describing the time-varying propagation characteristic indicates that the transmission signal will be minimally attenuated by the time-varying propagation characteristic.

3. The method of claim 2, wherein the data having the first priority comprises real-time data and the data having the second priority comprises non-real time data.

4. The method of claim 1, further comprising the step of repeatedly receiving updated information describing the time-varying propagation characteristic and selecting the transmission signal mode according to the updated information.

5. The method of claim 1, wherein:
   the method further comprises the step of selecting a power level of the transmitted signal according to the selected signal mode and the time-varying propagation characteristic; and
   wherein the transmission signal is generated according to the transmission signal mode and the selected power level.

6. The method of claim 1, wherein the transmission signal comprises a plurality of media programs, each having a transition synchronized with a transition of another of the plurality media programs and changes in the transmission signal mode are controlled to be made only during the synchronized transitions.

7. The method of claim 6, wherein the power level of the transmitted signal is controlled to be adjusted between the synchronized transitions.

8. The method of claim 6, wherein the transmission signal comprises a streaming media program, and wherein:
   the receiver comprises a module for storing the streaming media program, processing the stored media program to eliminate streaming media program interruptions from changes of the transmission signal mode.

9. The method of claim 1, wherein the method further comprises the steps of:
   generating a predicted time-varying propagation characteristic from the received information describing the time-varying propagation characteristic; and
   the transmission signal mode is selected according to the predicted time-varying propagation characteristic.

10. The method of claim 1, wherein the step of transmitting the generated transmission signal to the receiver comprises the step of:
    transmitting the generated transmission signal to the receiver at a beamwidth selected according to the time-varying propagation characteristic.

11. The method of claim 1, wherein the receiver further comprises a tuner and an adaptive controller for configuring the tuner to receive the transmission signal, and the method further comprises the steps of:
    configuring the receiver to a selected first candidate transmission signal mode from the plurality of transmission signal modes;
    attempting to receive the transmission signal in the receiver;
    determining, in the adaptive controller, if the transmission signal is received;
    selecting, in the adaptive controller, a second candidate transmission signal mode from the plurality of transmission signal modes if the transmission signal is not received; and
    setting, in the adaptive controller, the receiver to the first candidate transmission signal mode if the transmission signal is received.

12. An apparatus for transmitting an adaptively controlled signal to a subscriber receiver in a terrestrial region, comprising:
    an information receiver for receiving information describing a time-varying propagation characteristic of the signal in the terrestrial region;
    a signal generator for generating a transmission signal according to a selected one of a plurality of transmission signal modes, wherein the selected one of the transmission signal modes is selected according to the received information and the transmission signal modes are defined by transmission signal characteristics including modulation scheme, and code rate; and
    a transmitter for transmitting the generated transmission signal;
    wherein the transmission signal comprises a media program having a transition and the timing of a change in the selected transmission signal according to the selected one of the transmission signal modes is controlled to be made during the transition.

13. The apparatus of claim 12, wherein the plurality of transmission signal modes includes:
    a first transmission signal mode for transmitting data having a first priority via the transmission signal when the information describing the time-varying propagation characteristic indicates that the transmission signal will be maximally attenuated by the time-varying propagation characteristic; and
    a second transmission signal mode for transmitting the data having the first priority and additional data having a lower priority than the first priority when the information describing the time-varying propagation characteristic indicates that the transmission signal will be minimally attenuated by the time-varying propagation characteristic.

14. The apparatus of claim 13, wherein the data having the first priority comprises real-time data and the data having the second priority comprises non-real time data.

15. The apparatus of claim 12, wherein the information receiver repeatedly receives updated information describing the time-varying propagation characteristic and the signal generator further updates the transmission signal mode according to the updated information.

16. The apparatus of claim 12, wherein the signal generator further selects a power level of the transmitted signal according to the selected signal mode and the time-varying propagation characteristic, and wherein the transmission signal is generated according to the transmission signal mode and the selected power level.

17. The apparatus of claim 12, wherein the transmission signal comprises a plurality of media programs, each having a transition synchronized with a transition of another of the plurality of media programs and the signal generator is controlled to change the transmission signal mode only during the synchronized transitions.

18. The apparatus of claim 17, wherein the signal generator is controlled to adjust the power level of the transmitted signal between the synchronized transitions.

19. The apparatus of claim 16, wherein the transmission signal comprises a streaming media program and wherein:
the subscriber receiver comprises a module for storing the streaming media program and processing the stored media program to eliminate streaming media program interruptions from changes of the transmission signal mode.

20. The apparatus of claim 12, wherein the signal generator further generates a predicted time-varying propagation characteristic from the received information describing the time-varying propagation characteristic, and the transmission signal mode is selected according to the predicted time-varying propagation characteristic.

21. The apparatus of claim 12, wherein the step of transmitting the generated transmission signal to the receiver comprises the step of:
transmitting the generated transmission signal to the receiver at a beamwidth selected according to the time-varying propagation characteristic.

22. The apparatus of claim 12, further comprising a receiver having an adaptive controller for configuring the receiver to a selected first candidate transmission signal mode from the plurality of transmission signal modes, attempting to receive the generated transmission signal in the receiver, determining if the generated transmission signal is received, selecting a second candidate transmission signal mode from the plurality of transmission signal modes if the generated transmission signal is not received; and setting the receiver to the first candidate transmission signal mode if the generated transmission signal is received.

23. An apparatus for adaptively controlling a transmission signal for transmission to at least one receiver in a terrestrial region, comprising:
means for receiving information describing a time-varying propagation characteristic of the transmission signal in the terrestrial region;
means for selecting a transmission signal mode from a plurality of transmission signal modes according to the received information, the transmission signal modes defined by transmission signal characteristics including modulation scheme and code rate;
means for changing the transmission signal according to the selected transmission signal mode; and
wherein the transmission signal comprises a media program having a transition and the timing of a change in the transmission signal according to the selected transmission signal mode is controlled to be made during the transition.

24. The apparatus of claim 23, wherein the plurality of transmission signal modes includes:
a first transmission signal mode for transmitting data having a first priority via the transmission signal when the information describing the time-varying propagation characteristic indicates that the transmission signal will be maximally attenuated by the time-varying propagation characteristic; and
a second transmission signal mode for transmitting the data having the first priority and additional data having a lower priority than the first priority when the information describing the time-varying propagation characteristic indicates that the transmission signal will be minimally attenuated by the time-varying propagation characteristic.

25. The apparatus of claim 24, wherein the data having the first priority comprises real-time data and the data having the second priority comprises non-real time data.

26. The apparatus of claim 23, further comprising the step of repeatedly receiving updated information describing the time-varying propagation characteristic and selecting the transmission signal mode according to the updated information.

27. The apparatus of claim 23, wherein:
the apparatus further comprises the means for selecting a power level of the transmitted signal according to the selected signal mode and the time-varying propagation characteristic; and
wherein the transmission signal is generated according to the transmission signal mode and the selected power level.

28. The apparatus of claim 23, wherein the transmission signal comprises a plurality of media programs, each having a transition synchronized with a transition of another of the plurality of media programs and changes in the transmission signal mode are controlled to be made only during one of the synchronized transitions.

29. The apparatus of claim 28, wherein the power level of the transmitted signal is controlled to be adjusted between the synchronized transitions.

30. The apparatus of claim 27, wherein the transmission signal comprises a streaming media program, and wherein:
the receiver comprises a module for storing the streaming media program and processing the stored media program to eliminate streaming media program interruptions from changes of the transmission signal mode.

31. The apparatus of claim 23, further comprising means for generating a predicted time-varying propagation characteristic from the received information describing the time-varying propagation characteristic, and wherein the transmission signal mode is selected according to the predicted time-varying propagation characteristic.

32. The apparatus of claim 23, wherein the means for transmitting the generated transmission signal to the receiver comprises means for transmitting the generated transmission signal to the receiver at a beamwidth selected according to the time-varying propagation characteristic.

33. The apparatus of claim 23, further comprising a receiver, having:
means for configuring the receiver to a selected first candidate transmission signal mode from the plurality of transmission signal modes;
means for attempting to receive the transmission signal in the receiver;
means for determining if the transmission signal is received;
means for selecting a second candidate transmission signal mode from the plurality of transmission signal modes if the transmission signal is not received; and
means for setting the receiver to the first candidate transmission signal mode if the transmission signal is received.

34. The method of claim 1, wherein the transition is selected from the group consisting of:
a transition from a scene to another scene; and
a transition from the media program to a commercial.

35. The apparatus of claim 12, wherein the transition is selected from the group consisting of:
 a transition from a scene to another scene; and
 a transition from the media program to a commercial.

36. The apparatus of claim 23, wherein the transition is selected from the group consisting of:
 a transition from a scene to another scene; and
 a transition from the media program to a commercial.

\* \* \* \* \*